US008849483B2

(12) United States Patent
Kuwata et al.

(10) Patent No.: US 8,849,483 B2
(45) Date of Patent: Sep. 30, 2014

(54) TARGET TRAILING WITH SAFE NAVIGATION WITH COLREGS FOR MARITIME AUTONOMOUS SURFACE VEHICLES

(75) Inventors: Yoshiaki Kuwata, Los Angeles, CA (US); Michael T. Wolf, Los Angeles, CA (US); Dimitri V. Zarzhitsky, La Canada Flintridge, CA (US); Hrand Aghazarian, La Crescenta, CA (US); Terrance L. Huntsberger, Altadena, CA (US); Andrew B. Howard, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 13/446,899

(22) Filed: Apr. 13, 2012

(65) Prior Publication Data

US 2012/0265380 A1    Oct. 18, 2012

Related U.S. Application Data

(60) Provisional application No. 61/474,867, filed on Apr. 13, 2011, provisional application No. 61/499,819, filed on Jun. 22, 2011.

(51) Int. Cl.
*G01D 1/02* (2006.01)
*G01D 1/00* (2006.01)
*G05D 1/00* (2006.01)
*G05D 1/02* (2006.01)

(52) U.S. Cl.
CPC ............... *G05D 1/0206* (2013.01); *G05D 1/00* (2013.01); *G05D 1/02* (2013.01)
USPC ................ 701/21; 3/23; 3/300; 3/301; 3/519

(58) Field of Classification Search
CPC .......... G05D 1/00; G05D 1/02; G05D 1/0206
USPC ........................ 701/21, 3, 23, 300, 301, 519
See application file for complete search history.

(56) References Cited

U.S. PATENT DOCUMENTS

| | | | | | |
|---|---|---|---|---|---|
| 3,725,918 | A | * | 4/1973 | Fleischer et al. | 342/41 |
| 4,148,026 | A | * | 4/1979 | Gendreu | 342/80 |
| 4,313,115 | A | * | 1/1982 | O'Sullivan | 342/41 |
| 4,623,966 | A | * | 11/1986 | O'Sullivan | 701/301 |
| 5,579,285 | A | * | 11/1996 | Hubert | 367/133 |
| 5,786,849 | A | * | 7/1998 | Lynde | 348/113 |
| 6,078,849 | A | * | 6/2000 | Brady et al. | 701/28 |

(Continued)

*Primary Examiner* — Calvin Cheung
*Assistant Examiner* — Angelina Shudy
(74) *Attorney, Agent, or Firm* — Milstein Zhang & Wu LLC; Joseph B. Milstein

(57) ABSTRACT

Systems and methods for operating autonomous waterborne vessels in a safe manner. The systems include hardware for identifying the locations and motions of other vessels, as well as the locations of stationary objects that represent navigation hazards. By applying a computational method that uses a maritime navigation algorithm for avoiding hazards and obeying COLREGS using Velocity Obstacles to the data obtained, the autonomous vessel computes a safe and effective path to be followed in order to accomplish a desired navigational end result, while operating in a manner so as to avoid hazards and to maintain compliance with standard navigational procedures defined by international agreement. The systems and methods have been successfully demonstrated on water with radar and stereo cameras as the perception sensors, and integrated with a higher level planner for trailing a maneuvering target.

20 Claims, 23 Drawing Sheets

(56) References Cited

U.S. PATENT DOCUMENTS

| | | |
|---|---|---|
| 6,610,971 B1 * | 8/2003 | Crabtree ..................... 244/3.1 |
| 6,672,533 B1 * | 1/2004 | Regebro ..................... 244/3.13 |
| 6,889,140 B2 * | 5/2005 | Isogai et al. ................. 701/301 |
| 7,139,647 B2 * | 11/2006 | Larsen .......................... 701/21 |
| 7,394,046 B2 * | 7/2008 | Olsson et al. ................. 244/3.1 |
| 7,710,309 B2 * | 5/2010 | Kao et al. ....................... 342/41 |
| 7,769,544 B2 * | 8/2010 | Blesener et al. ............. 701/301 |
| 7,865,277 B1 * | 1/2011 | Larson et al. .................. 701/23 |
| 7,957,858 B1 * | 6/2011 | Larson et al. .................. 701/23 |
| 8,108,147 B1 * | 1/2012 | Blackburn ................... 701/301 |
| 8,150,621 B1 * | 4/2012 | Phillips et al. ................ 701/411 |
| 8,204,677 B2 * | 6/2012 | Rosenfeld et al. ............ 701/500 |
| 8,275,493 B2 * | 9/2012 | Ruffa ................................ 701/2 |
| 8,346,415 B1 * | 1/2013 | Hinnant, Jr. .................... 701/21 |
| 2003/0127558 A1 * | 7/2003 | Heizmann-Bartels ....... 244/3.16 |
| 2003/0167998 A1 * | 9/2003 | Huntsman ..................... 114/312 |
| 2004/0068416 A1 * | 4/2004 | Solomon ........................... 705/1 |
| 2004/0222902 A1 * | 11/2004 | Wortsmith ................. 340/932.2 |
| 2005/0004723 A1 * | 1/2005 | Duggan et al. .................. 701/24 |
| 2005/0027412 A1 * | 2/2005 | Hobson et al. .................. 701/21 |
| 2007/0043502 A1 * | 2/2007 | Mudalige et al. ............. 701/207 |
| 2007/0051292 A1 * | 3/2007 | Kilbourn et al. .............. 114/311 |
| 2007/0219720 A1 * | 9/2007 | Trepagnier et al. ........... 701/300 |
| 2009/0167592 A1 * | 7/2009 | Kao et al. ......................... 342/41 |
| 2009/0216444 A1 * | 8/2009 | Crowell ........................ 701/213 |
| 2009/0276105 A1 * | 11/2009 | Lacaze et al. ..................... 701/2 |
| 2010/0042269 A1 * | 2/2010 | Kokkeby et al. .................. 701/3 |
| 2010/0168942 A1 * | 7/2010 | Noffsinger et al. ............. 701/21 |
| 2010/0256909 A1 * | 10/2010 | Duggan et al. ................ 701/301 |
| 2010/0292871 A1 * | 11/2010 | Schultz et al. .................... 701/3 |
| 2010/0332136 A1 * | 12/2010 | Duggan et al. ................ 701/301 |
| 2011/0029155 A1 * | 2/2011 | Ruffa ................................ 701/2 |
| 2011/0288714 A1 * | 11/2011 | Flohr et al. ....................... 701/27 |
| 2012/0035788 A1 * | 2/2012 | Trepagnier et al. ............... 701/3 |
| 2012/0095629 A1 * | 4/2012 | Fjellstad et al. ................. 701/21 |
| 2012/0277941 A1 * | 11/2012 | Noffsinger et al. ............. 701/21 |
| 2013/0051175 A1 * | 2/2013 | Boberg et al. .................. 367/16 |
| 2013/0131908 A1 * | 5/2013 | Trepagnier et al. ............. 701/23 |

* cited by examiner

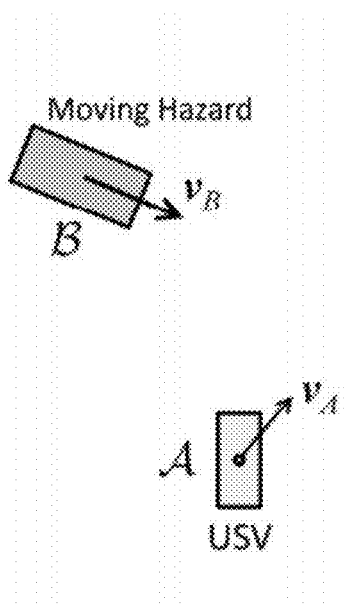
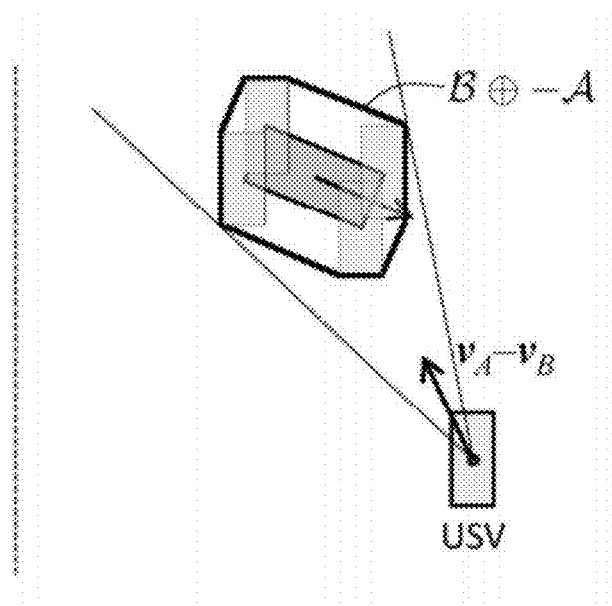
FIG. 3A              FIG. 3B
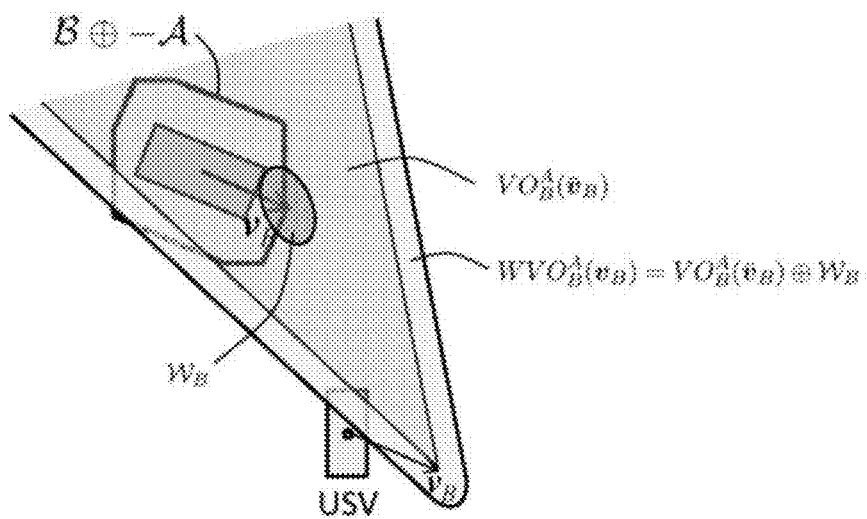
FIG. 4

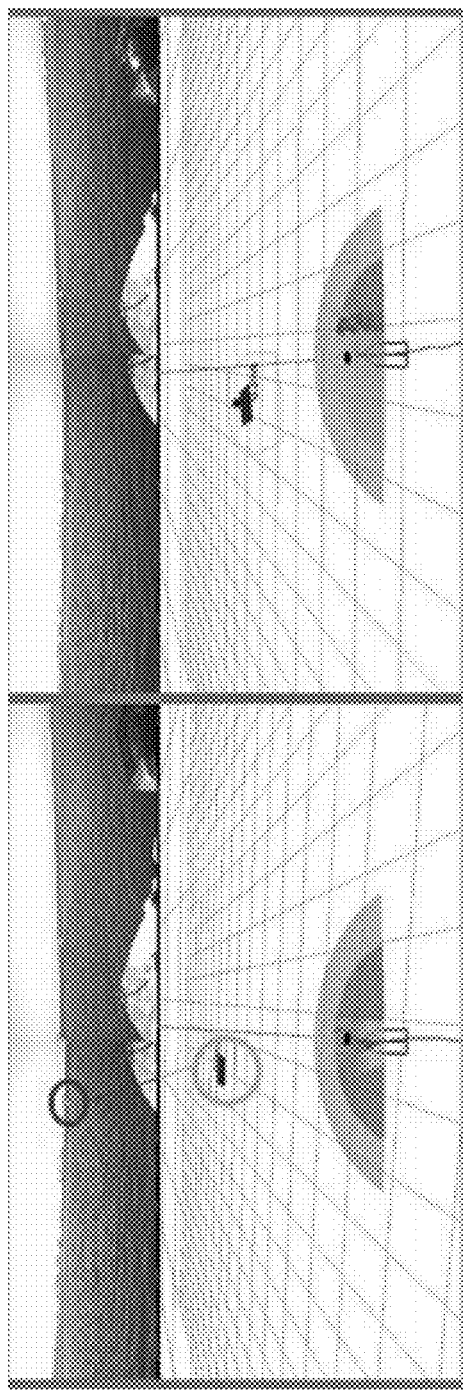
FIG. 12B1
FIG. 12A1
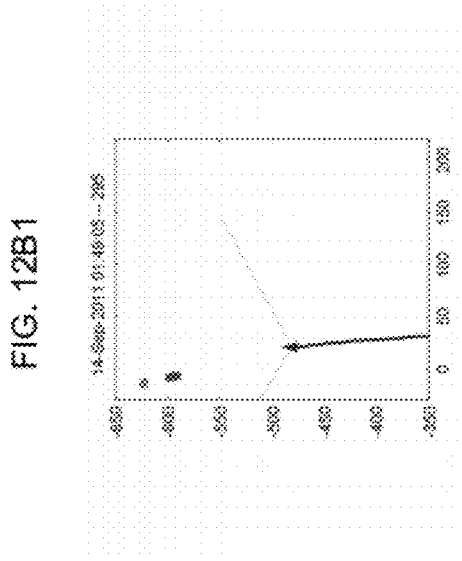
FIG. 12B2
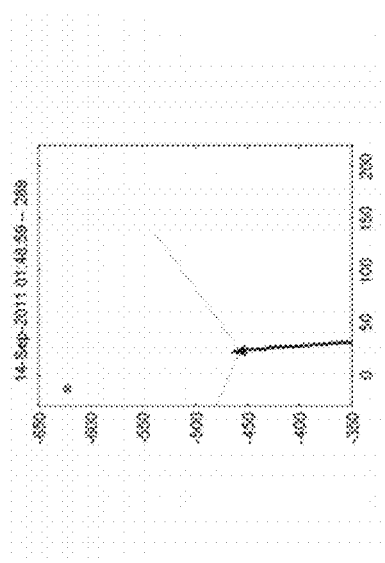
FIG. 12A2

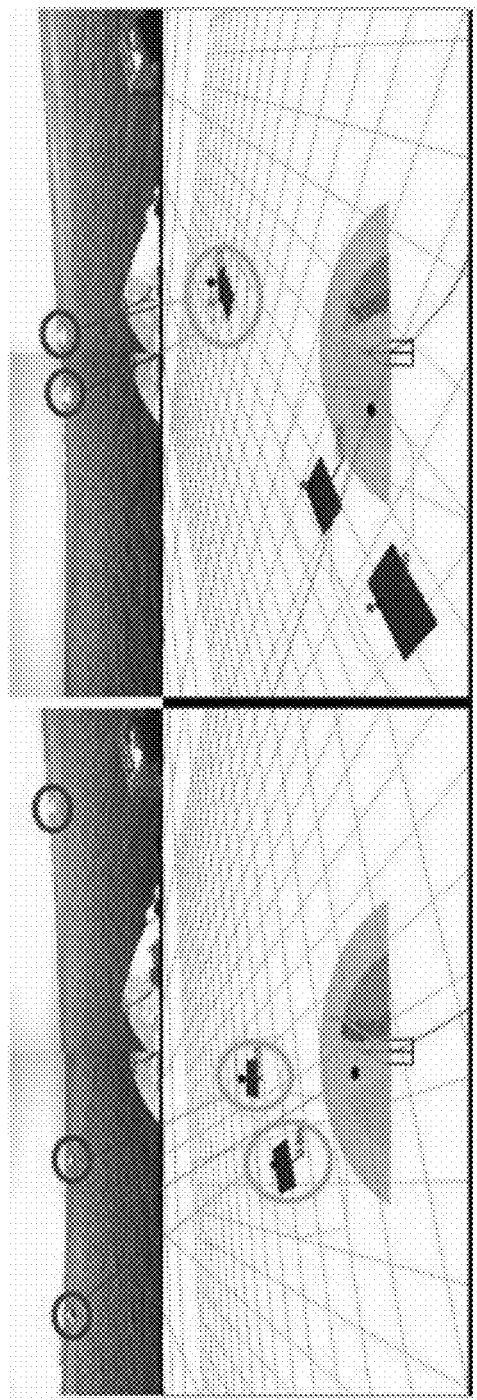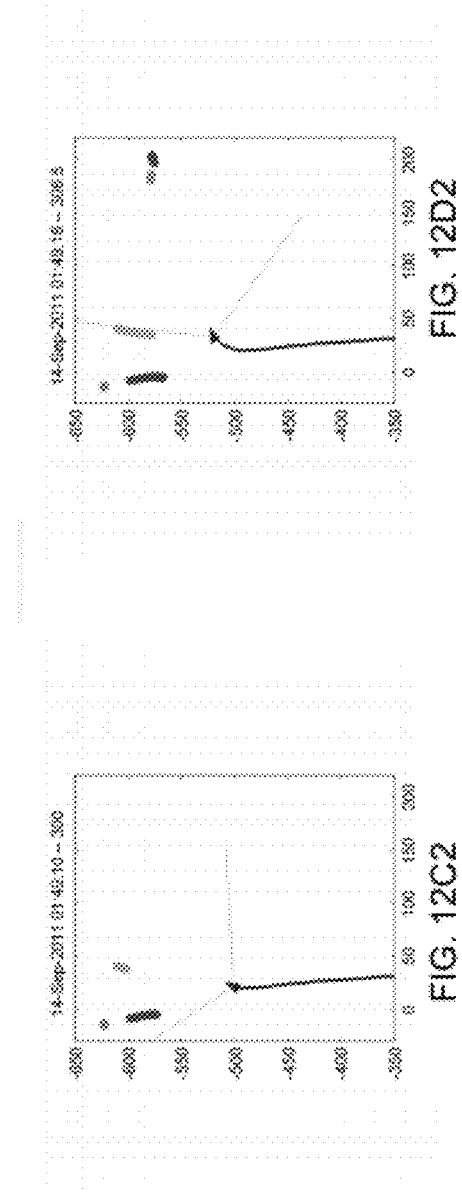
FIG. 12D1
FIG. 12D2
FIG. 12C1
FIG. 12C2

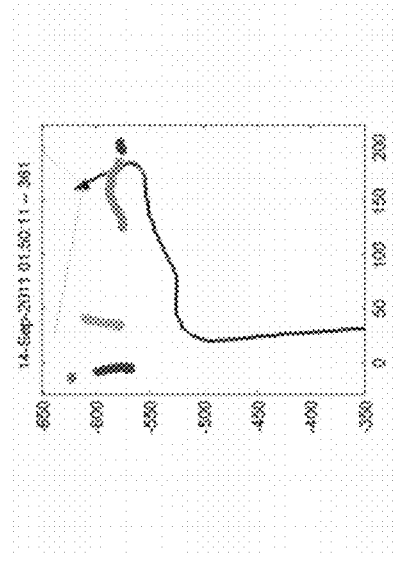
FIG. 12F
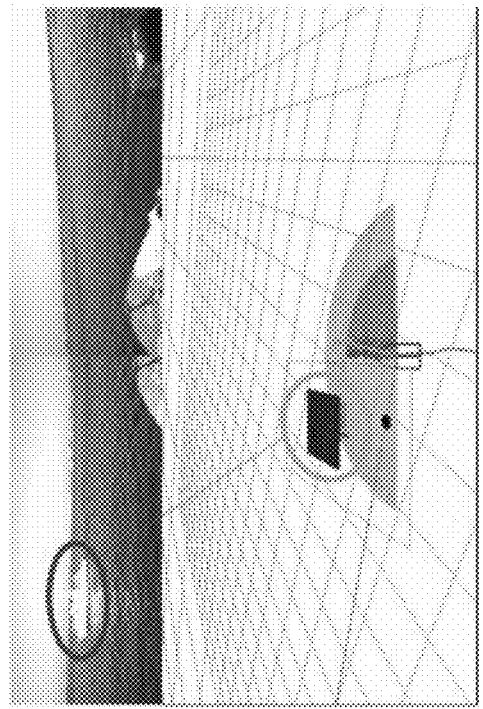
FIG. 12E1
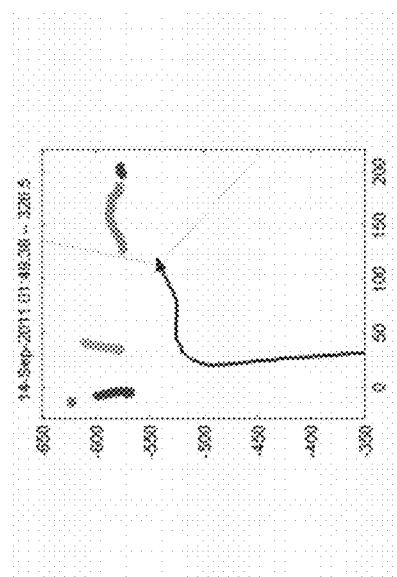
FIG. 12E2

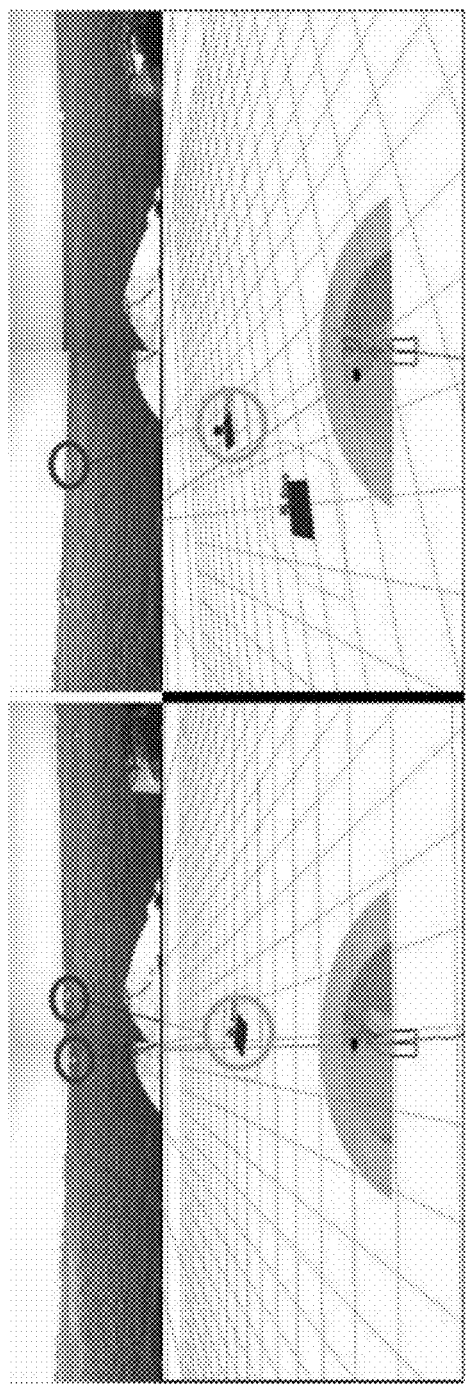
FIG. 13B1
FIG. 13A1
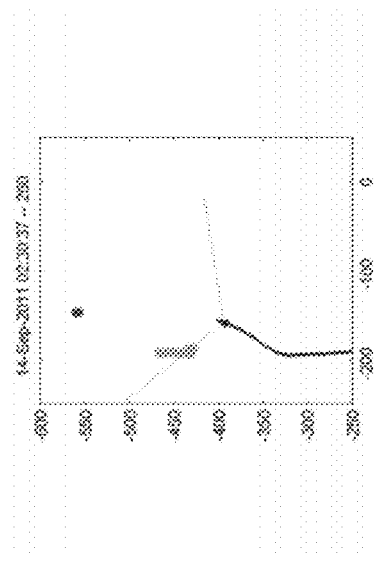
FIG. 13B2
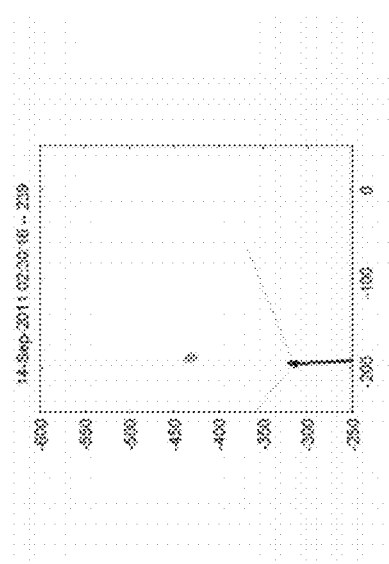
FIG. 13A2

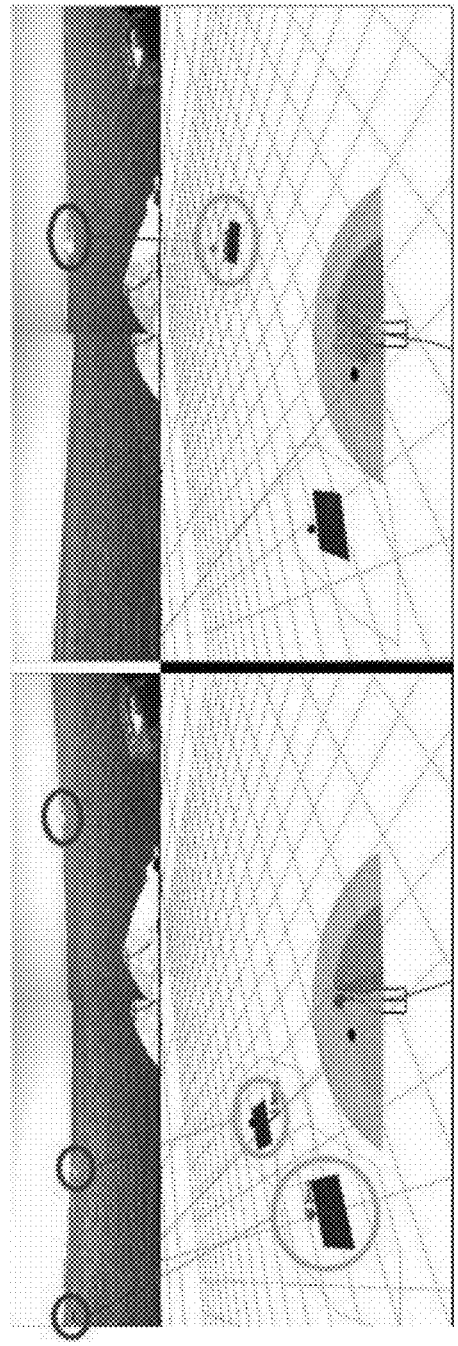
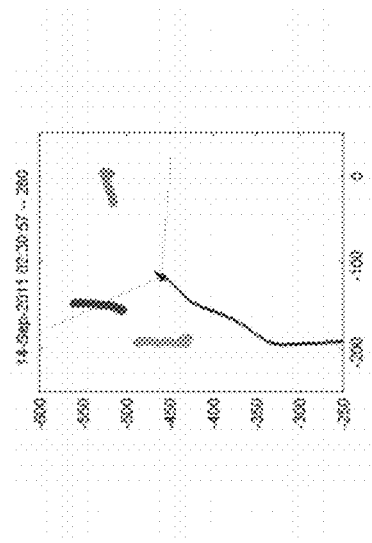
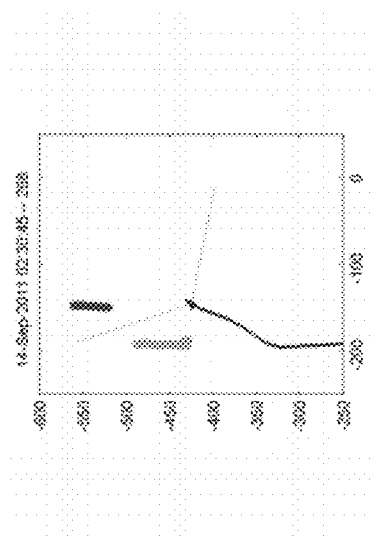
FIG. 13C1
FIG. 13C2
FIG. 13D1
FIG. 13D2

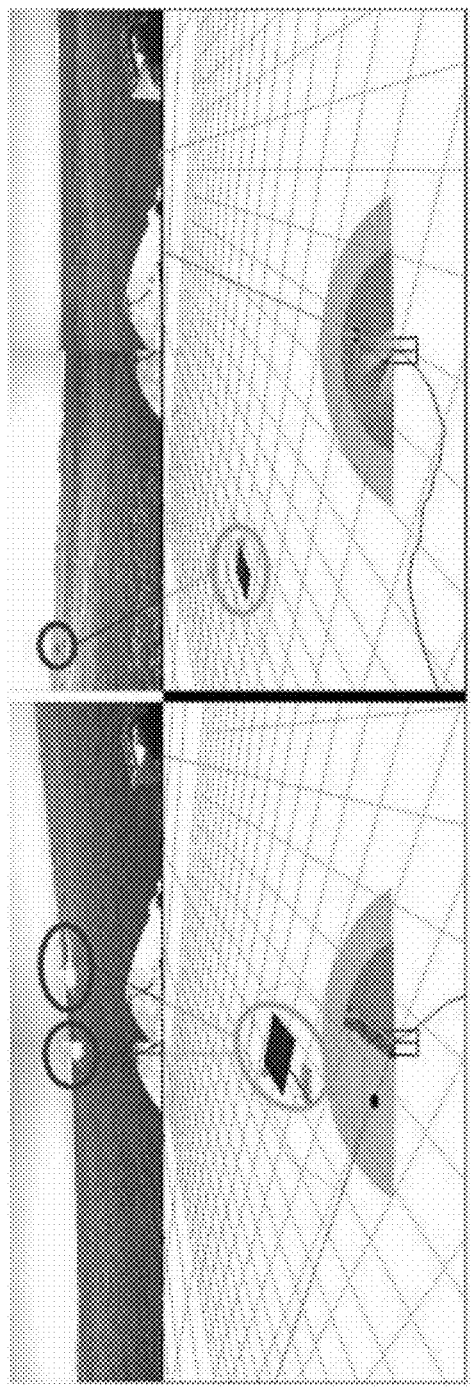
FIG. 13F1
FIG. 13E1
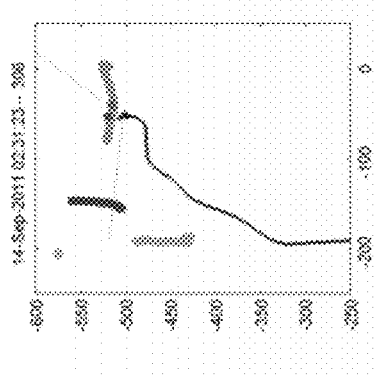
FIG. 13F2
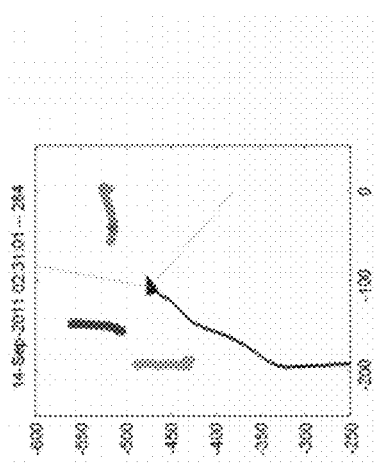
FIG. 13E2

TARGET TRAILING WITH SAFE NAVIGATION WITH COLREGS FOR MARITIME AUTONOMOUS SURFACE VEHICLES

CROSS-REFERENCE TO RELATED APPLICATIONS

This application claims priority to and the benefit of U.S. provisional patent application Ser. No. 61/474,867 filed Apr. 13, 2011, and claims priority to and the benefit of U.S. provisional patent application Ser. No. 61/499,819 filed Jun. 22, 2011, each of which applications is incorporated herein by reference in its entirety.

STATEMENT REGARDING FEDERALLY FUNDED RESEARCH OR DEVELOPMENT

The invention described herein was made in the performance of work under a NASA contract, and is subject to the provisions of Public Law 96-517 (35 USC 202) in which the Contractor has elected to retain title.

THE NAMES OF THE PARTIES TO A JOINT RESEARCH AGREEMENT

The inventions claimed in the present application were made as a result of activities undertaken within the scope of a Joint Research Agreement between the Jet Propulsion Laboratory (JPL) operated by the California Institute of Technology for NASA and the U.S. Naval Surface Warfare Center, Norfolk, Va. under JPL Task Plan No. 90-8952 entered into in 2004, and a Joint Research Agreement between JPL and the U.S. Navy SPAWAR Systems Center San Diego, San Diego, Calif. under JPL Task Plan No. 81-9996 entered into in 2005.

FIELD OF THE INVENTION

The invention relates to systems and methods for operating autonomous vehicles in general and particularly to systems and methods for operating waterborne autonomous vehicles.

BACKGROUND OF THE INVENTION

Operation of vessels in a maritime setting involves adherence to standardized navigation rules that are intended to avoid collisions or other dangerous navigation conditions. These standardized navigation rules (the International Regulations for Preventing Collisions at Sea, known as COLREGS) are well known and are generally adhered to by all vessels, from small sailing vessels to commercial vessels such as cruise liners and shipping vessels such as container ships and tankers, as well as military vessels when operating under conventional operating conditions.

In recent years, significant technological advancements have increased on-board capabilities of Unmanned Surface Vehicles (USVs), so that their intended mission scenarios now routinely include environments shared with other seagoing traffic. See Program Executive Officer for Littoral and Mine Warfare (PEO (LMW)), "The Navy Unmanned Surface Vehicle (USV) Master Plan," U.S. Navy, Tech. Rep., 2007; and J. Larson, M. Bruch, and J. Ebken, "Autonomous navigation and obstacle avoidance for unmanned surface vehicles," in SPIE Proc. 6230: Unmanned Systems Technology VIII, 2006, pp. 17-20.

In maritime navigation, ships should obey the International Regulations for Preventing Collisions at Sea (known as COLREGS, for Collision Regulations), agreed to by the International Maritime Organization (IMO) in 1972. See U.S. Department Of Homeland Security, U.S. Coast Guard, Navigation Rules. Paradise Cay Publications, 2010. These "rules of the road" specify the types of maneuvers that should be taken in situations where there is a risk of collision. When USVs are operated in the vicinity of other vessels, their navigation algorithms must abide by COLREGS, so that the USVs can safely avoid other vessels and the drivers of other vessels can rely on a range of safe behaviors from the USVs. A variety of approaches to maritime navigation obeying COLREGS has been proposed in the past, such as fuzzy logic (see S.-M. Lee, K.-Y. Kwon, and J. Joh, "A Fuzzy Logic for Autonomous Navigation of Marine Vehicles Satisfying COLREG Guidelines," International Journal of Control, Automation, and Systems, vol. 2, no. 2, pp. 171-181, 2004; and L. P. Perera, J. P. Carvalho, and C. G. Soares, "Autonomous guidance and navigation based on the COLREGs rules and regulations of collision avoidance," in Proceedings of the International Workshop "Advanced Ship Design for Pollution Prevention", 2009, pp. 205-216.), evolutionary algorithms (see J. Colito, "Autonomous Mission Planning and Execution for Unmanned Surface Vehicles in Compliance with the Marine Rules of the Road," Master's thesis, University of Washington, 2007.), neural networks, hybrids of these algorithms (see T. Statheros, G. Howells, and K. M. Maier, "Autonomous Ship Collision Avoidance Navigation Concepts, Technologies and Techniques," Journal of Navigation, vol. 61, no. 1, pp. 129-142, 2008.), interval programming (see M. Benjamin, J. Curcio, and P. Newman, "Navigation of Unmanned Marine Vehicles in Accordance with the Rules of the Road," in Proceedings of the IEEE International Conference on Robotics and Automation, 2006.), and 2D grid maps (see K. Teo, K. W. Ong, and H. C. Lai, "Obstacle Detection, Avoidance and Anti Collision for MEREDITH AUV," in OCEANS, MTS/IEEE Biloxi—Marine Technology for Our Future: Global and Local Challenges, 2009.). However, these previous approaches do not scale well to multiple traffic boats and multiple COLREGS rules, especially on robotic platforms with real-time computational requirements. Furthermore, most results cited in the literature are limited to simulation, where real world issues such as uncertainties of USV motion, computational and communication delays, and noise in the perception system are not present.

There is a need for systems and methods for navigating and operating autonomous waterborne vessels that provide safe operation while accomplishing a desired sailing action.

SUMMARY OF THE INVENTION

According to one aspect, the invention features a system for navigating an unmanned waterborne surface vehicle safely to a desired location. The system comprises one or more sensors configured to be mounted on an unmanned waterborne surface vehicle, the one or more sensors configured to detect the presence of one or more objects different from the unmanned waterborne surface vehicle in the vicinity of the one or more sensors, each of the one or more sensors having a control terminal configured to allow control of the sensor, and each of the one or more sensors having an output terminal configured to provide a signal representative of the presence of the one or more objects different from the unmanned waterborne surface vehicle; and a general purpose programmable computer including instruction recorded on a machine readable memory, the general purpose programmable computer operatively coupled to each of the one or more sensors. The general purpose programmable computer when operating under the instructions configured to perform the following steps: (i) controlling an operational state of each of the one or more sensors, the operational state selected from the group of operational states consisting of an on state and an off state; (ii) receiving from the one or more sensors one or more respective output signals representative of the presence of the one or more objects different from the unmanned waterborne surface vehicle; (iii) deducing from the received one or more respective output signals whether there is present the one or more objects different from the unmanned waterborne surface vehicle; (iv) if there is present the one or more objects different from the unmanned waterborne surface vehicle, computing for each such object a location, a velocity and a heading; (v) applying a first set of rules configured to direct the unmanned waterborne surface vehicle to reach a desired location; (vi) applying a second set of rules configured to direct the unmanned waterborne surface vehicle to avoid each of the one or more objects different from the unmanned waterborne surface vehicle that are present; (vii) generating a command to be issued to the unmanned waterborne surface vehicle to operate at a particular velocity and along a particular heading, so as to approach the desired location while avoiding a collision with each of the one or more objects different from the unmanned waterborne surface vehicle that are present; and (viii) iteratively repeating steps (i) through (vii) until the desired location is reached.

In one embodiment, the system further comprises an unmanned waterborne surface vehicle operatively connected to the one or more sensors and to the general purpose programmable computer.

In another embodiment, the object different from the unmanned waterborne surface vehicle is a hazardous object.

In yet another embodiment, the object different from the unmanned waterborne surface vehicle is an object of interest to be followed.

In still another embodiment, the desired location is a position in proximity to the object of interest to be followed.

In a further embodiment, the desired location is updated using the most recent position of the object of interest to be followed.

In yet a further embodiment, the desired location is a location defined on a map of the Earth's surface.

In an additional embodiment, the general purpose programmable computer when operating under the instructions configured to perform the step of displaying to a user information that is representative of the location, the velocity and the heading for at least one of the one or more objects different from the unmanned waterborne surface vehicle deduced as being present in step (iii).

In one more embodiment, the location, the velocity and the heading are computed in step (iv) relative to a location, a velocity and a heading of the unmanned waterborne surface vehicle.

In still a further embodiment, the general purpose programmable computer includes a user interface that allows a human operator to override a command generated in step (viii).

In a further embodiment, the first set of rules is a strategic planner.

In yet a further embodiment, the second set of rules is a local planner.

In an additional embodiment, the second set of rules includes COLREGS rules.

In one more embodiment, the one or more sensors are selected from the group of sensors consisting of radar, sonar, lidar, and stereo cameras.

According to another aspect, the invention relates to a method of navigating an unmanned waterborne surface vehicle safely to a desired location. The method comprising the steps of: controlling an operational state of each of one or more sensors, the operational state selected from the group of operational states consisting of an on state and an off state, the one or more sensors configured to detect the presence of one or more objects different from the unmanned waterborne surface vehicle in the vicinity of the one or more sensors, each of the one or more sensors having a control terminal configured to allow control of the sensor, and each of the one or more sensors having an output terminal configured to provide a signal representative of the presence of the one or more objects different from the unmanned waterborne surface vehicle; and using a general purpose programmable computer including instruction recorded on a machine readable memory to perform the following steps: receiving from the one or more sensors one or more respective output signals representative of the presence of the one or more objects different from the unmanned waterborne surface vehicle; deducing from the received one or more respective output signals whether there is present the one or more objects different from the unmanned waterborne surface vehicle; if there is present the one or more objects different from the unmanned waterborne surface vehicle, computing for each such object a location, a velocity and a heading; applying a first set of rules configured to direct the unmanned waterborne surface vehicle to reach a desired location; applying a second set of rules configured to direct the unmanned waterborne surface vehicle to avoid each of the one or more objects different from the unmanned waterborne surface vehicle that are present; generating a command to be issued to the unmanned waterborne surface vehicle to operate at a particular velocity and along a particular heading, so as to approach the desired location while avoiding a collision with each of the one or more objects different from the unmanned waterborne surface vehicle that are present; and iteratively repeating the above steps until the desired location is reached.

In still a further embodiment, the desired location is a location proximate to one of the objects deduced to be present in step (iii).

In one embodiment, the desired location is a predicted location of one of the objects deduced to be present in step (iii).

In another embodiment, the second set of rules includes COLREGS rules.

In yet another embodiment, the one or more sensors are selected from the group of sensors consisting of radar, sonar, lidar and stereo cameras.

In still another embodiment, the object different from the unmanned waterborne surface vehicle is an object of interest to be followed.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 3A is a diagram illustrating the positions and relative velocities of a USV and a potential hazard.

FIG. 3B is a diagram that provides a graphical interpretation of a Velocity Obstacle (VO). When the relative velocity of the robot $v_A - v_B$ points inside the cone formed by the robot center and the expanded obstacle $A \oplus B$, they will collide. The Velocity Obstacle imposed on robot's velocity $v_A$ is this cone shifted by the $v_B$ vector.

FIG. 4 is a diagram illustrating a Worst case Velocity Obstacle (WVO) when there are uncertainties in the velocity of the moving obstacle.

FIG. 12A1 is a composite image, in which the lower panel is a plot of data and the upper panel is a pair of stereo optical images. In FIG. 12A1 the USV detects one of the 7 m RHIBs, but the estimated velocity is low enough and USV simply treats it as a stationary hazard. No COLREGS constraint is applied.

FIG. 12A2 is a path diagram corresponding to FIG. 12A1.

FIG. 12B1 is a composite image, in which the lower panel is a plot of data and the upper panel is a pair of stereo optical images. In FIG. 12B1 the 7 m RHIB approaches, the USV recognizes the head-on situation, and applies the COLREGS constraint.

FIG. 12B2 is a path diagram corresponding to FIG. 12B1.

FIG. 12C1 is a composite image, in which the lower panel is a plot of data and the upper panel is a pair of stereo optical images. In FIG. 12C1 the USV detects two head-on vessels, and avoids them by moving further to the starboard. The 12 meter boat is visible in the image, but is not detected by the tracker.

FIG. 12C2 is a path diagram corresponding to FIG. 12C1.

FIG. 12D1 is a composite image, in which the lower panel is a plot of data and the upper panel is a pair of stereo optical images. In FIG. 12D1 the USV avoids all three vehicles. The USV treat the 12 meter vessel to be in both the crossing situation and the head-on situation.

FIG. 12D2 is a path diagram corresponding to FIG. 12D1.

FIG. 12E1 is a composite image, in which the lower panel is a plot of data and the upper panel is a pair of stereo optical images. In FIG. 12E1 the USV successfully avoids the 12 meter boat.

FIG. 12E2 is a path diagram corresponding to FIG. 12E1.

FIG. 12F is a diagram illustrating the overall path.

FIG. 13A1 is a composite image, in which the lower panel is a plot of data and the upper panel is a pair of stereo optical images. In FIG. 13A1 the USV recognizes the overtaking situation, and initiate a turn maneuver going starboards to obey COLREGS, even though the straight line to the waypoint passes on the port side of the traffic boat.

FIG. 13A2 is a path diagram corresponding to FIG. 13A1.

FIG. 13B1 is a composite image, in which the lower panel is a plot of data and the upper panel is a pair of stereo optical images. In FIG. 13B1, during the overtaking, the USV detects another vehicle in the head-on situation.

FIG. 13B2 is a path diagram corresponding to FIG. 13B1.

FIG. 13C1 is a composite image, in which the lower panel is a plot of data and the upper panel is a pair of stereo optical images. In FIG. 13C1 the USV successfully avoids the head-on vehicle.

FIG. 13C2 is a path diagram corresponding to FIG. 13C1.

FIG. 13D1 is a composite image, in which the lower panel is a plot of data and the upper panel is a pair of stereo optical images. In FIG. 13D1 the USV is now in both the head-on and crossing situation. It veers to its starboard to let the 12 meter boat maintain its course, because the 12 meter boat is the stand-on vessel in this situation.

FIG. 13D2 is a path diagram corresponding to FIG. 13D1.

FIG. 13E1 is a composite image, in which the lower panel is a plot of data and the upper panel is a pair of stereo optical images. In FIG. 13E1 the USV successfully avoids the crossing vehicle.

FIG. 13E2 is a path diagram corresponding to FIG. 13E1.

FIG. 13F1 is a composite image, in which the lower panel is a plot of data and the upper panel is a pair of stereo optical images. In FIG. 13F1, after the successful avoidance of the 12 meter vessel, the boat being overtaken comes in the view again.

FIG. 13F2 is a path diagram corresponding to FIG. 13F1.

DETAILED DESCRIPTION

Figures 1A, 1B, 1C, 1D:
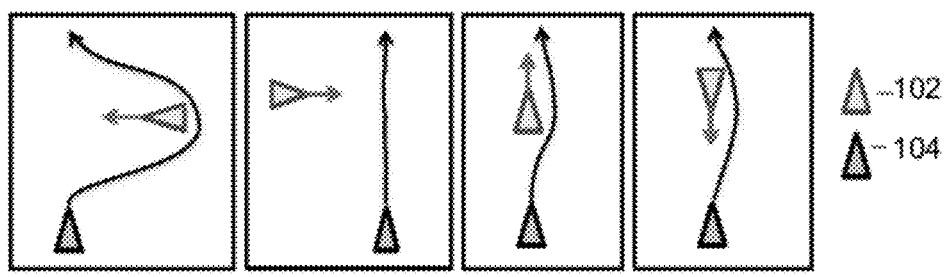
FIG. 1A through FIG. 1D illustrate maneuvers required for various COLREGS situations.

This technology uses hardware to obtain data about the objects in the vicinity of a maritime autonomous surface vehicle (ASV), also referred to as an autonomous waterborne vessel, and uses software to implement a motion planning module to accomplish a desired task, such as trailing an object of interest in a safe manner. The software module is designed to trail a designated "target" while also avoiding static and dynamic surface hazards. When the system detects surface hazards such as other moving boats, the motion planner applies International Regulations for Preventing Collisions at Sea (COLREGS); an important subset of these rules has been implemented in the software. In addition, in the case that contact with the target is lost, the software can receive and follow a "reacquisition route", provided by a complementary system, until the target is reacquired. The invention can provide the ASV with the following types of capabilities: the ASV can "shadow" or "keep tabs on" another waterborne vehicle; the invention can provide the ASV the capability to catch another waterborne vehicle that is out of control; the invention can provide the ASV the capability to interdict or intercept another waterborne vehicle; and the invention can provide the ASV the capability to autonomously and safely negotiate a path from a first known location (e.g., point 1 on a map) to another known location (e.g., point 2 on a map) for example to provide an autonomous ferry service between the two points.

Problem Statement

The software receives as input the following data:

A list of surrounding sensor contacts, which might be buoys, other boats, etc., with position, velocity, and uncertainty information, which are primarily objects to be avoided; and the "target" is designated in this list;

For the case of active contact with the target: a set of predicted "detectability maps", indicating desirable ASV poses at particular future time points;

For the case of lost contact with the target: a "reacquisition route", providing desirable waypoints for the ASV to regain contact with the target;

Ownship state information from an inertial navigation system (INS); and nautical chart data indicating safe water regions (optional, for littoral regions).

Given the above information, the motion planning software attempts to maintain contact with the target as much as possible, while making certain to avoid collisions with static and dynamic hazards. When a COLREGS scenario is encountered, the motion planner needs to recognize the scenario and follow the evasive course designated by these "rules of the road." A subset of the COLREGS rules has been implemented, which includes head-to-head, crossing, and overtake situations. If contact with the target is lost and the motion planner receives a reacquisition route, the software will follow the reacquisition route while also applying its safe navigation rules. Note that, because trailing and reacquisition are time-sensitive, the ASV goal locations have "arrival times" at which the ASV should be at the location. Additionally, because the target detection sensor may be orientation specific, the goal locations may include particular heading values to point the sensor appropriately. It is assumed that the ASV has at least a slight advantage over the target in terms of speed and maneuverability.

Integrating track-and-trail behavior with safe navigation (hazard avoidance and COLREGS) is the crux of this motion planning software. There are several challenges to be faced when merging and arbitrating between these behaviors, including:

Dealing with Multiple Objectives

A difficult aspect of the problem of combining competing behaviors is deciding how to choose the ASV motion when objectives are competing to move differently (e.g., trail vs. COLREGS). This can be considered an act of "arbitration" (selecting the one behavior to "pay attention to") or "multi-objective optimization" (combining the behaviors in a way that best compromises between all objectives). Further, some objectives might be mandatory (e.g., avoid collisions), while others are desirable but not as critical (e.g., COLREGS).

Temporal Considerations

Most previous hazard avoidance motion planning approaches just try to reach a "waypoint" safely. When trailing, however, the time it takes to maneuver is of consequence, as the ASV must reposition itself correctly to keep acquisition of the target.

Unstructured, Dynamic Environment

Other agents in the environment are moving, and, unlike some environments such as roadways, there is little to no structure to rely on for guiding the motion of agents or the robot ASV.

Uncertainty

The software must account for uncertainty of target and traffic, including sensor uncertainty of the current states and prediction uncertainty of future actions.

Noise

The environment is very noisy, both for measurement and motion control. Significant motion due to vehicle roll/pitch/yaw exists due to sea motion, which is an issue unique to maritime vehicles.

Power and Processor Limitations

The motion planning software runs on a real-time embedded system, where power and processing speed are limited. Thus, the choice of algorithms must account for these real-world limitations in computational capability.

Structure

Figures 2A, 2B:
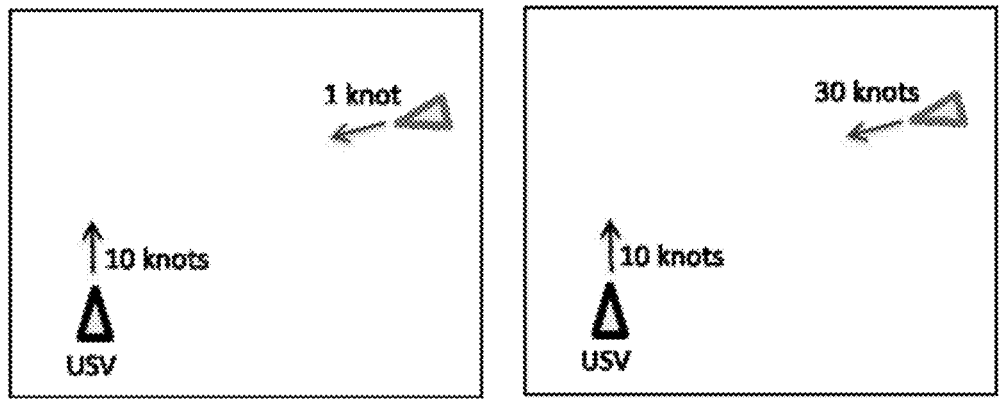
FIG. 2A is a diagram of a situation in which COLREGS might not apply.
FIG. 2B is a diagram of a situation in which COLREGS might apply even with the identical geometric setup as in FIG. 2A.
Figure 2C:
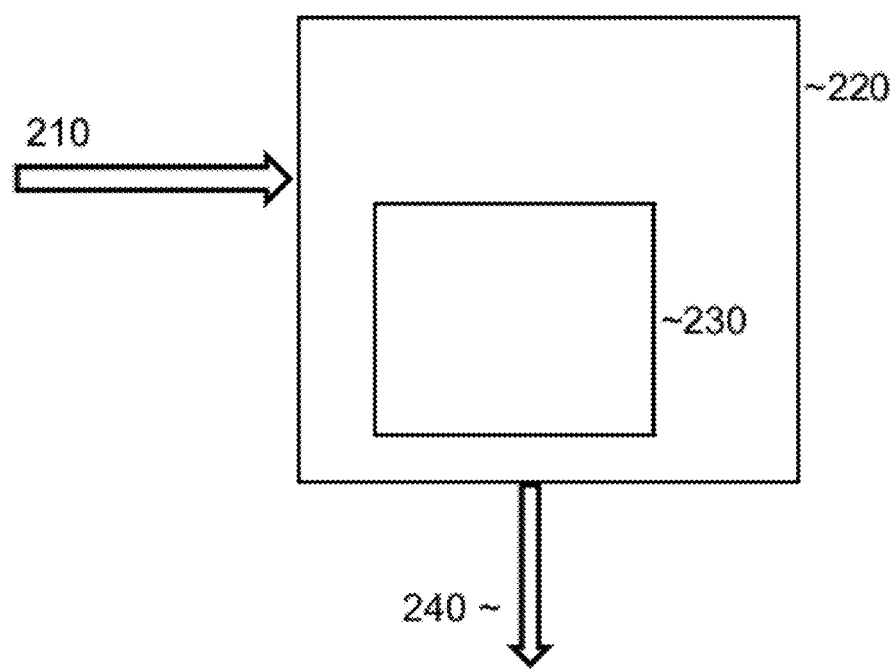
FIG. 2C is a flowchart showing how the software structure of the present invention is decomposed into a strategic planner and a local planner.

The algorithmic approach taken in one embodiment is to decompose the problem into a global/strategic planner and a local planner (See FIG. 2C). FIG. 2C is a flowchart showing how the software structure of the present invention is decomposed into a strategic planner (the outer loop 220) and a local planner (the inner loop 230). The outer loop inputs 210 include a contact list; INS data; DNC/ENC; a target detectibility map; and a reacquisition trajectory. The role of the strategic planner is to interpret the target detectability maps and reacquisition routes and convert them into mid-level waypoint goal queue for the ASV. These waypoint goals may have arrival times and desired headings specified as well as two-dimensional surface position. The role of the local planner is to achieve these waypoint goals safely (or determine that they are not reachable), that is, avoiding hazards and applying COLREGS rules. The output 240 of the software module is a velocity command for the ASV, including a velocity magnitude and a heading.

The outer loop provides a strategic planner that sets waypoint goals based on mission mode and mission objectives. The outer loop deals with reaching a specific point, whether defined as a fixed point on a map, or defined as a predicted location of another waterborne vessel ("the other vessel") at a later time. The other vessel can be a surface vessel or a vessel capable of operating beneath the surface of the water, such as a submarine. The outer loop performs the steps of: interpreting the target detectibility map; translating the reacquisition trajectory; accepting manual commands; setting strategic goals based on expected arrival time, geography, and other parameters.

The inner loop provides a local planner that ensures safe navigation. The inner loop uses the information about the location that the vessel is trying to reach and computes a possible path that will be a safe path. The inner loop performs the steps of: avoiding static and dynamic obstacles; applying the COLREGS rules; balancing the motion needed to accomplish the goal and operating under safe navigation conditions; and updating the sensor data. The inner loop provides as output a velocity command and a heading command (or a time series of such commands) that are acted upon by the autonomous waterborne vessel.

Provision for a human operator to issue commands that can override the computed commands is provided as well. The human operator can be located on the autonomous waterborne vessel, or the human operator can be located away from the autonomous waterborne vessel, and can observe events remotely by telemetry (e.g., visual images, data, and/or other signals that contain information about the autonomous waterborne vessel and its surroundings) and can issue commands from the remote location.

We now describe an autonomous motion planning algorithm for Unmanned Surface Vehicles (USVs) or maritime autonomous surface vehicle (ASVs) to navigate safely in dynamic, cluttered environments. The algorithm not only addresses Hazard Avoidance (HA) for stationary and moving hazards, but also applies the International Regulations for Preventing Collisions at Sea (COLREGS). The COLREGS rules specify, for example, which vessel is responsible for giving way to the other and to which side of the "stand-on" vessel to maneuver. Three primary COLREGS rules are considered: crossing, overtaking, and head-on situations. For autonomous USVs (or ASVs) to be safely deployed in environments with other traffic boats, it is imperative that the USV's navigation algorithm obeys COLREGS. Furthermore, when other boats disregard their responsibility under COLREGS, the USV must fall back to its HA algorithms to prevent a collision. The approach used in one embodiment is based on the Velocity Obstacles (VO) method, which generates a cone-shaped obstacle in the velocity space. Because Velocity Obstacles also specify on which side of the obstacle the vehicle will pass during the avoidance maneuver, COLREGS are encoded in the velocity space in a natural way. This motion planner is used for the task of following a target, where the Strategic Planner commands USV waypoints based on high-level objectives and the local planner ensures hazard avoidance and compliance with COLREGS during traverse. We present details of a specific strategic planner which calculates waypoint goals for trailing a target vessel. Results from several experiments involving up to four vessels are presented, in what we believe is the first on-water demonstration of autonomous COLREGS maneuvers without explicit inter-vehicle communication.

There are actually separate sets of rules for international waters and, for example, inland waters in the United States. We consider the international regulations specified by the 1972 COLREGS. We assume all surface traffic consists of roughly equivalent power-driven vessels. Different COLREGS priorities apply to sailing vessels and other special situations. Consequently, as autonomous USVs are operated alongside other manned and unmanned vehicles, they need to be able to safely avoid other vessels. The present systems and methods can be augmented to include other COLREGS rules, which have not yet been implemented in the embodiments described hereinbelow.

The Velocity Obstacle (VO) approach has been adopted by several researchers for moving hazard avoidance. Since it was first proposed in 1998 for robot motion planning (see P. Fiorini and Z. Shiller, "Motion Planning in Dynamic Environments Using Velocity Obstacles," International Journal of Robotics Research, vol. 17, no. 7, pp. 760-772, 1998), several extensions to VO have been made, including a cooperative form of collision avoidance (see J. van den Berg, M. Lin, and D. Manocha, "Reciprocal Velocity Obstacles for Real-Time Multi-Agent Navigation," in Proceedings of the IEEE International Conference on Robotics and Automation, 2008, pp. 1928-1935), probabilistic velocity obstacles (see B. Kluge and E. Prassler, "Reflective Navigation: Individual Behaviors and Group Behaviors," in Proceedings of the IEEE International Conference on Robotics and Automation, 2004; and C. Fulgenzi, A. Spalanzani, and C. Laugier, "Dynamic Obstacle Avoidance in uncertain environment combining PVOs and Occupancy Grid," in Proceedings of the IEEE International Conference on Robotics and Automation, 2007), and crowd simulation (see J. van den Berg, S. Patil, J. Sewall, D. Manocha, and M. C. Lin, "Interactive Navigation of Multiple Agents in Crowded Environments," in Symposium on Interactive 3D Graphics and Games, 2008). VO approaches generate a cone-shaped obstacle in the velocity space (hence the name Velocity Obstacles) and ensure that there will be no future collisions as long as the robot's velocity vector is outside of the VO. In order to identify the risk of future collisions, one could predict both the pose of the moving hazard and the pose of the robot for several time steps into the future, and perform collision checks using their configurations at each time slice. This approach has the advantage that it can check collisions of vehicles following arbitrary trajectories. However, because it needs to perform collision checks at many time slices, the computational load becomes very high. On the other hand, VO makes a first-order (i.e., linear) prediction, and the collision check is done in the velocity space. Since a single collision check accounts for collision checks at all future times (due to the linear velocity assumption), VO is very fast to compute and is well-suited for robotic applications where the algorithm is implemented on embedded systems that have limited computational resources and hard real-time constraints.

We extend VO in the context of maritime navigation subject to COLREGS. In particular, we use VO to avoid moving and static hazards, but also generate an additional set of constraints in the velocity space when the USV is in certain COLREGS situations. Because both VO and COLREGS are defined in vehicle's body-fixed frame, COLREGS constraints are expressed together with VO in a very natural way.

In addition, we discuss how the above "safe navigation" approach fits into the context of an algorithm for autonomous maritime target trailing. Typically, VO approaches assume a goal location (more precisely, a goal velocity) has been identified in advance. Thus, we embed our VO approach as a local planner for reaching goals safely, while a more general strategic planner sets the waypoint goals based on the USV's mission objectives. Here, we present a strategic planner that aims to track (i.e., maintain sensor contact with) a target vessel and trail the target over time. Our trailing problem is difficult because (a) the target vessel is allowed different capabilities from the USV (e.g., a submarine that can travel underneath the surface traffic) and (b) we assume the target sensor is directional, placing strong restrictions on the USV's heading as well as its surface position. We address this by using predictive "target detectability maps" (TD Maps) to calculate 4-dimensional waypoint goals (x, y, heading, and arrival time) for the local planner to reach.

Review of COLREGS

We address the following three primary COLREGS situations: crossing, head-on, and overtaking. FIG. 1A through FIG. 1D illustrate the rules in these situations. The darker triangle represents the robot (USV), and the lighter triangle represents the traffic boat. In FIG. 1A, the traffic boat is crossing from the right. The COLREGS rule states that in this situation, the vessel that has the other on its starboard (right) side must give way. Therefore, the USV (the "give-way" vessel) must avoid the traffic boat (the "stand-on" vessel), and the traffic boat does not need to alter its path. In FIG. 1B, the traffic boat is crossing from the left. In this case, the traffic boat is the give-way vessel, and USV should be allowed to maintain its course. We assume all surface traffic consists of roughly equivalent power-driven vessels. Different COLREGS priorities apply to sailing vessels and other special situations. In FIG. 1C, the USV is overtaking a slow traffic boat. In this situation, the USV must ensure enough clearance, so that it keeps out of the way of the traffic boat being overtaken. Although COLREGS do not specify which side of the boat it must overtake, common practice on the water dictates that the overtaking boat should pass on the right side of the traffic boat. In FIG. 1D, the USV and the traffic boat are moving straight toward each other, head-on. Here, both vessels must alter their course toward the starboard, so that they pass with the other vessel to its port (left) side.

Even in a simple scenario, whether or not a COLREGS rule applies is not a trivial evaluation to make, especially as the rules are written for human operators and often include subjective measures. Nor is the evaluation a simple function of the vehicles' relative position (e.g., bearing angle or distance) and/or vehicle heading. For example, as shown in FIG. 2A and FIG. 2B, even when the traffic vessel and USV are in the same geometric configuration, the crossing rule might or might not apply, depending on their relative speeds and the separation between the vessels.

COLREGS Motion Planner
Problem Statement

The problem considered for the Local Planner is stated as follows. Given a near-term waypoint, a reference speed, and a list of contacts representing moving and static hazards, find the best velocity command that avoids the hazards and obeys COLREGS.

Review of Velocity Obstacles

We briefly review the Velocity Obstacles approach to robot motion planning that serves as a foundation for this work. Let us first introduce some mathematical notations. Let $p \in \mathbb{R}^2$ denote the robot's position vector and $v \in \mathbb{R}^2$ denote the velocity vector in a two dimensional space. A ray starting from p going into the direction of v is defined as $$\lambda(p,v) = \{p + tv | t \geq 0\}. \quad (1)$$

Furthermore, the following set operations are used to express the VO.

Minkowski sum: $\mathcal{A} \oplus \mathcal{B} = \{a + b | a \in \mathcal{A}, b \in \mathcal{B}\}$ (2)

Reflection: $-\mathcal{A} = \{-a | a \in \mathcal{A}\}$ (3)

Then, given a robot of shape A and a obstacle of shape B moving at velocity $v_B$, the VO of obstacle B in the velocity space of robot A is given as $$VO_B^A(v_B) = \{v_A | \lambda(p_A, v_A - v_B) \cap (\mathcal{B} \oplus -\mathcal{A}) \neq \emptyset\} \quad (4)$$

where $p_A$ and $p_B$ are the position of the robot and the obstacle, and $v_A$ and $v_B$ are their velocity vectors, respectively. A simple interpretation of (4) is that the ray starting from robot A and going in the direction of the relative velocity ($v_A - v_B$) intersects the obstacle B expanded by the robot size A. The reason for this C-space expansion is the ability to treat the robot as a point. FIG. 3A is a diagram illustrating the positions and relative velocities of a rectangular robot USV and a rectangular moving hazard. FIG. 3B is a diagram that provides a graphical interpretation of a Velocity Obstacle (VO). When the relative velocity of the robot $v_A - v_B$ points inside the cone formed by the robot center and the expanded obstacle A⊕B, they will collide. The Velocity Obstacle imposed on robot's velocity $v_A$ is this cone shifted by the $v_B$ vector. As shown in this example, a VO is a cone in the velocity space.

As long as the robot's velocity lies outside of VO, it will not collide with the obstacle, assuming that the velocity vectors are constant over time. If the velocity vectors change over time, the VO-based approach reacts by re-planning using the latest sensor information. In practice, when the re-planning rate is much faster than the change in the vehicles' trajectories, the assumption of linear velocities is reasonable. In one embodiment, the re-plan rate is 1 Hz on an embedded system, and the angular velocity of the boat is typically less than 30 degrees per second. This re-plan rate can be increased, as the motion planning computation itself is very fast (on the order of several milliseconds).

When multiple craft are involved, simply overlaying the VO of each ship and taking a superposition generates a set of constraints on the robot's feasible velocity vector. The run time of the VO-based approach is at worst linear with the number of hazards considered.

Time-to-Collision

When the velocity $v_A$ is inside the velocity obstacle, the time-to-collision $\tau$ can be obtained by computing the time it takes for the relative velocity vector $v_A - v_B$ to intersect the boundary of $\mathcal{A} \oplus \mathcal{B}$, i.e., $$p_A + \tau(v_A - v_B) \in \partial(\mathcal{B} \oplus -\mathcal{A}) \quad (5)$$

where $\partial(\cdot)$ denotes the boundary of the set. If there are multiple $\tau$'s that satisfy (5), the one with the minimum value is selected.

Uncertainty Handling

The motion planner that is deployed in the real world must account for various types of uncertainties. Moving hazards are detected and tracked using on-board sensors such as radar (see L. Elkins, D. Sellers, and W. R. Monach, "The autonomous maritime navigation (AMN) project: Field tests, autonomous and cooperative behaviors, data fusion, sensors, and vehicles," Journal of Field Robotics, vol. 27, no. 6, pp. 790-818, 2010), cameras (see T. Huntsberger, H. Aghazarian, A. Howard, and D. C. Trotz, "Stereo vision-based navigation for autonomous surface vessels," Journal of Field Robotics, vol. 28, no. 1, pp. 3-18, 2011), and lidar. Performance characteristics of the sensor in turn affect the noise and state estimation errors for the tracked traffic boat.

Another source of uncertainty comes from the imprecise motion of the moving hazards. VO assumes constant velocities of the moving agents, but in reality their trajectory does not necessarily maintain a constant velocity. In order to account for such uncertainties in the traffic vehicle, its velocity $v_B$ is modeled as $v_B = \bar{v}_B + \delta_B$, where $\bar{v}_B$ is the nominal velocity (i.e., the expected velocity that is estimated by the vehicle tracker), and $\delta_B$ captures the uncertainties of the vehicle's velocity. We assume that the uncertain component of the velocity lies in a set $\delta_B \in \mathcal{W}_B$, where $\mathcal{W}_B$ is a bounded set and is treated as a constant. Then, the velocity obstacle with the worst-case uncertainty (denoted by "WVO") is written as $$WVO_B^A(v_B) = VO_B^A(\bar{v}_B) \oplus \mathcal{W}_B. \quad (6)$$

FIG. 4 is a diagram illustrating a Worst case Velocity Obstacle (WVO) when there are uncertainties in the velocity of the moving obstacle. FIG. 4 shows the same case that was shown in FIG. 3B but with uncertainties. The gray cone shows the VO with the nominal velocity. In this example, the moving hazard B has a velocity uncertainty $\mathcal{W}_B$, which is drawn with an ellipse centered at the nominal velocity $\bar{v}_B$. The worst case VO is slightly larger than the nominal VO, and the boundary lines are parallel to those of the VO. As shown later, the VO is treated as a hard constraint, but the region $\mathcal{W}_B$ of WVO is treated as a soft constraint to provide a safety buffer.

VO with COLREGS

Figure 5:
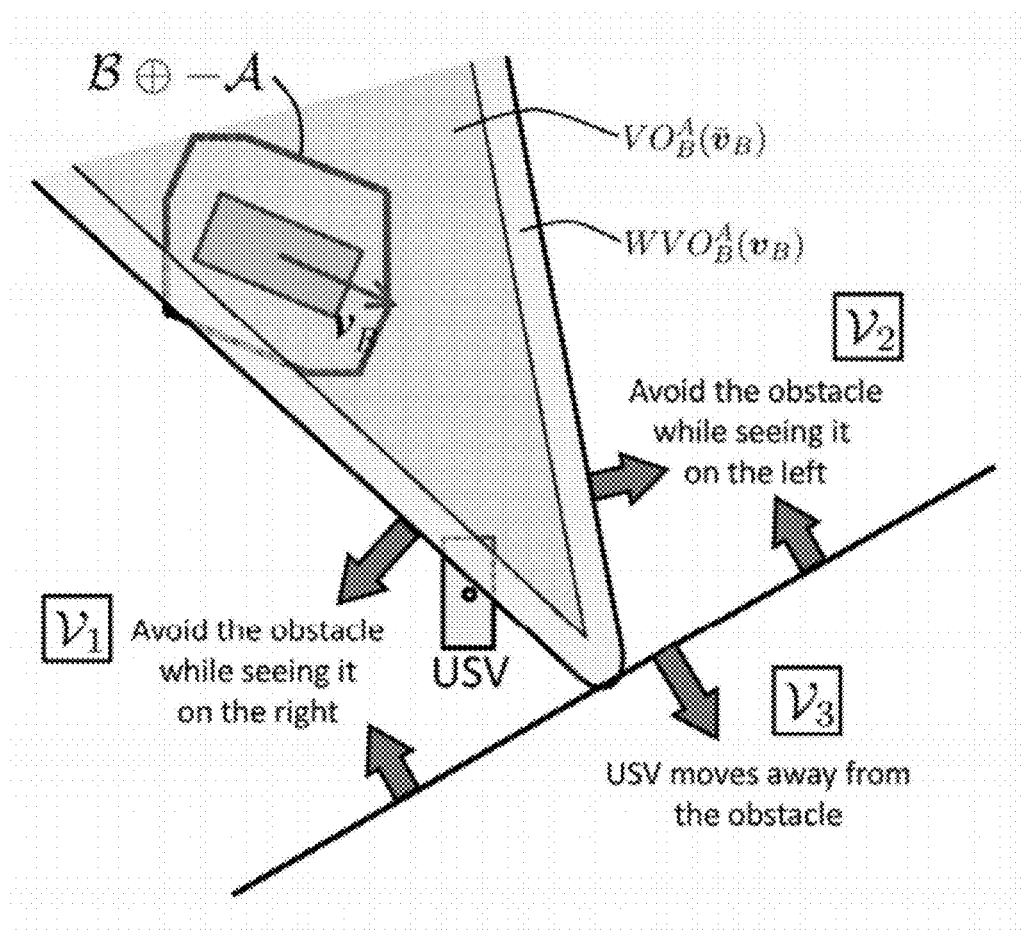
FIG. 5 is a diagram illustrating the constraints in the velocity space imposed by COLREGS.

VO is a set of constraints in the USV's velocity space needed to avoid moving obstacles. Our approach treats COLREGS as an additional set of constraints in the velocity space. One advantage of using VO to encode COLREGS is that the VO already has the information on which side of the hazard the USV should pass. FIG. 5 is a diagram illustrating the constraints in the velocity space imposed by COLREGS. FIG. 5 shows a single VO and a feasible velocity space divided into three regions. The line dividing $V_3$ from $V_1$ and $V_2$ is tangent to $WVO_B^A(v_B)$ and is perpendicular to the centerline of the VO cone, which is parallel to $p_B-p_A$, the line connecting the center of the USV and the center of the moving obstacle. When USV follows a velocity in $V_3$, the relative velocity of USV points away from the obstacle, i.e., $$(p_B-p_A)\cdot(v_A-v_B)<0, \forall \delta_B \in \mathcal{W}_B.$$

so that the vehicles do not approach any closer.

When USV follows a velocity in $V_1$, $$\mathcal{V}_1=\{v|v\notin WVO_B^A(v_B), v\notin \mathcal{V}_3, \exists \delta_B \in \\ \mathcal{W}_B \text{ s.t. }[(p_B-p_A)\times(v_A-v_B)]_z<0\}$$

then the USV will pass the obstacle while seeing it on the right side. Here, the $[\bullet]_z$ operator extracts the z component of the vector. We use the conventional body-fixed frame, with +x pointing forward, +y pointing right, and +z pointing downward. This region $V_1$ is treated as inadmissible when the USV is overtaking the traffic vessel B, when they are in a head-on situation, and when the traffic vessel B is crossing from the right. Note that when $v_A \in V_1$, USV will see the vessel B on the starboard side, thus cutting in front of the vessel B.

This rule-based constraint $v_A \notin V_1$ ensures that the USV will only pass from the right (when $v_A \in V_2$) or does not pass (when $v_A \in V_3$).

Note that when vessel B is crossing from the left, there is no COLREGS constraint on USV because vessel B is responsible for avoiding the USV. Even without the COLREGS constraint, however, VO always exists and hence the USV will avoid any moving hazard. This is necessary to ensure safety in case vessel B violates COLREGS and does not take any avoidance measures. Similarly, while being overtaken, no COLREGS constraints are applied.

Algorithm Flow

The first step in the algorithm flow is done by a rule selector, whose role is to detect if a moving vessel is in a specific COLREGS situation with respect to the USV. As illustrated in FIG. 2A and FIG. 2B, it is not sufficient to analyze only the geometric relation between the USV and moving hazards.

The procedure used in one embodiment includes the following:

Pre-Collision Check

The rule selector first computes a Closest Point of Approach (CPA) with the current position and velocity of the USV and traffic vessels, and evaluates if any COLREGS rules need to be applied at all. This approach ensures that we apply COLREGS only to the relevant vehicles and is more efficient than computing CPA for every potential USV velocity with every moving vessel.

Figure 6:
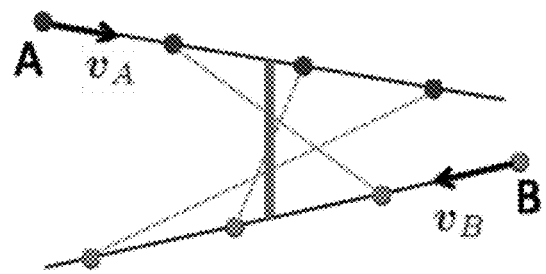
FIG. 6 is a diagram illustrating the Closest Point of Approach (CPA).

The CPA between two vessels is computed as follows. Given two points $p_A$, $p_B$ and their velocity vectors $v_A$, $v_B$, the time to CPA $t_{CPA}$ is given by $$t_{CPA} = \begin{cases} 0 & \text{if } \|v_A - v_B\| \leq \varepsilon \\ \frac{(p_A - p_B)\cdot(v_A - v_B)}{\|v_A - v_B\|^2} & \text{otherwise,} \end{cases} \quad (7)$$

as shown in FIG. 6. FIG. 6 is a diagram illustrating the Closest Point of Approach. Each dot corresponds to a position at a specific time, and the dashed lines show the distance between two agents A and B. The closest distance is marked with a thick bar. The distance at CPA $d_{CPA}$ is then computed by $$d_{CPA}=\|(p_A+v_A t_{CPA})-(p_B+v_B t_{CPA})\|. \quad (8)$$

For each moving vessel, the motion planner examines whether COLREGS rules apply only if the situation is likely to lead to a collision or a near-collision in the short-term future, that is, by checking if $$0 \leq t_{CPA} \leq t_{max}, \text{and } d_{CPA} \leq d_{min}. \quad (9)$$

Rule Selection:

Once the CPA meets the condition (9), the rule selector identifies which COLREGS situation applies. Because "crossing from the left" and "crossing from the right" require USV to perform distinctly different maneuvers, the rule selector considers the following four situations and their respective rules: overtake, head-on, crossing from the left, and crossing from the right.

The rule selector decides that it is in an overtake situation when the following conditions are all satisfied.

Distance: $\|p_A-p_B\| \leq D_{max}$

Heading: $|\theta_A-\theta_B| \leq \theta_{max}$

Cross-track: $y_B \leq y_{max}$

Along-track: $x_B \geq x_{min}$ where $\theta_A$ and $\theta_B$ are the heading direction of the current velocity vector, and $(x_B, y_B)$ are the vehicle B's position measured in A's body-fixed frame.

Similarly, it is considered to be in the head-on situation when the following conditions are all satisfied.

Distance: $\|p_A-p_B\| \leq D_{max}$

Heading: $|\theta_A-\theta_B+\pi| \leq \theta_{max}$

Cross-track: $y_B \leq y_{max}$

Along-track: $x_B \geq x_{min}$

It is considered to be in the "crossing from the right" when the following conditions are all satisfied.

Heading: $\theta_{min} \leq \theta_B-\theta_A \leq \theta_{max}$

Bearing: $b_{min} \leq b_B \leq b_{max}$

Heading-Bearing relation: $\theta_B > b_B - \pi$

Cross-track: $y_B \geq y_{min}$ where $b_B$ denotes the relative bearing of B from the USV. The third bullet is to ensure that the moving hazard is not coming up behind the USV.

It is considered to be in the "crossing from the left" when the following conditions are all satisfied.

Heading: $\theta_{min} \leq \theta_B-\theta_A+\pi \leq \theta_{max}$

Cross-track: $y_B \leq -y_{min}$

Hysteresis

If a completely new decision is made at every time step, as in the CPA-based rule selection discussed above, the USV might end up with a "chattering" behavior. This is because the uncertainty in the situational awareness could make the COLREGS constraints turn on and turn off very frequently, which drastically alters the feasible region of the decision space, as shown in $V_1$ of FIG. 5. FIG. 5 is a diagram illustrating the constraints in the velocity space imposed by COLREGS.

In order to alleviate churning, in one embodiment we introduce hysteresis to the rule selector and lower the bandwidth of the system. It also has the added benefit that once a COLREGS maneuver (e.g., overtaking, crossing) is initiated, it continues to direct the boat for at least a minimum duration of time, thereby making the USV's decision more obvious and predictable to human drivers on other vessels.

Because the moving obstacles are output by the vehicle tracker, each moving obstacle is assigned a unique ID. Using this vehicle ID, we maintain a short history of vehicle-rule pairs, i.e., which vehicle meets the criteria of which rule. If a vehicle meets the criteria of a certain COLREGS rule, it is considered to be in a COLREGS situation. However, even if a vehicle does not meet the criteria at the current time step, as long as the vehicle met the criteria in any of the last $n_h$ time steps, we still apply the corresponding COLREGS rule. Informally, the parameter $n_h$ is a length of the hysteresis and controls how often the USV can "change its mind" in the COLREGS situations. If the vehicle does not meet the criteria $n_h$ times in a row, then the corresponding vehicle-rule pair is removed from memory.

In some embodiments multiple COLREGS rules could be active at the same time with the same traffic vehicle. For example, if the boat is coming from a diagonal direction around the boundary of crossing and head-on direction, one might want to apply both rules in order to mitigate sensing noise and to ensure vehicle safety. Constraints for multiple COLREGS rules in the velocity space can be easily generated by simply superposing each COLREGS-based constraint to form a net constraint for that vehicle.

Cost

We use a regular discrete grid in the $v$–$\theta$ space to find the best velocity vector, where $v$ is the speed of the USV. Once the constraint sets of VO and COLREGS are generated, for each $v_i$ and $\theta_j$ that is still admissible, the vehicle computes the following cost:

$$J_{ij} = \frac{w_\tau}{\tau_{ij}} + w_v \left\| v_{ref} - \begin{bmatrix} v_i \cos\theta_j \\ v_i \sin\theta_j \end{bmatrix} \right\|_Q \quad (10)$$

where $w_\tau$ is a weight on the time-to-collision, $v_{ref}$ is a desired velocity to reach the next near-term goal, $w_v$ is a weight on the deviation from desired velocity, and $\|\cdot\|_Q$ is a weighted two-norm of a vector. The weighting matrix Q of size 2-by-2 allows us to weigh the deviation of the along-track velocity and the cross-track velocity differently. If $(v_i,\theta_j) \in$ WVO and $(v_i,\theta_j) \notin$ VO, then the weight $w_\tau$ on time-to-collision is reduced in order to soften the constraints on WVO. Once all the costs are computed, the $(v_i, \theta_j)$ pair with the minimum cost is selected and the velocity command is sent to the vehicle controller.

In principle, even though VO "looks ahead" into the future of the robot and moving agents, it is possible to construct a case where the robot is trapped because VO is a local planner. However, such a situation is unlikely to happen in practice, especially for on-water applications, where there are typically only a few vehicles that need to be avoided simultaneously. If one needs to generate a path in a maze-like environment, while avoiding moving hazards, it can be combined with a global path planner that takes into account the obstacles at a longer range. The next section explains how the COLREGS planner presented in this section is used as a local planner for more complex USV missions.

Application to Target Trailing

The problem statement considered in one embodiment is to trail a moving submarine using a forward-looking sonar sensor, while avoiding hazards and obeying COLREGS with surface traffic vessels. The sonar has a limited field of view and a limited detection range, but it is important for the USV to stay behind the submarine at some distance in order to track the submarine. The difference between the USV and submarine capabilities also makes the problem challenging, because while the USV must obey COLREGS to avoid traffic vessels on the water, the submarine in many instances can simply pass underneath them, if the water is deep enough.

In one embodiment, we decompose the problem into three components: generation of a target detectability map, strategic planning, and local planning. The target detectability map (TD Map) predicts the probability of tracking the submarine from a range of surface poses. The strategic planner uses the TD Map to generate waypoint goals that are most likely to maintain contact with the target. The local planner, for which we employ the approach presented hereinabove, is then responsible for reaching the waypoint goals while avoiding hazards and obeying COLREGS. In a dynamic and uncertain environment, the TD Map is frequently updated, and the strategic planner makes adjustments to the near-term goal for the local planner. This approach is shown to be sufficient to maintain the trail of the target under a wide variety of target maneuvers and surface conditions, as will be discussed hereinbelow.

Target Detectability Map

Figure 7:
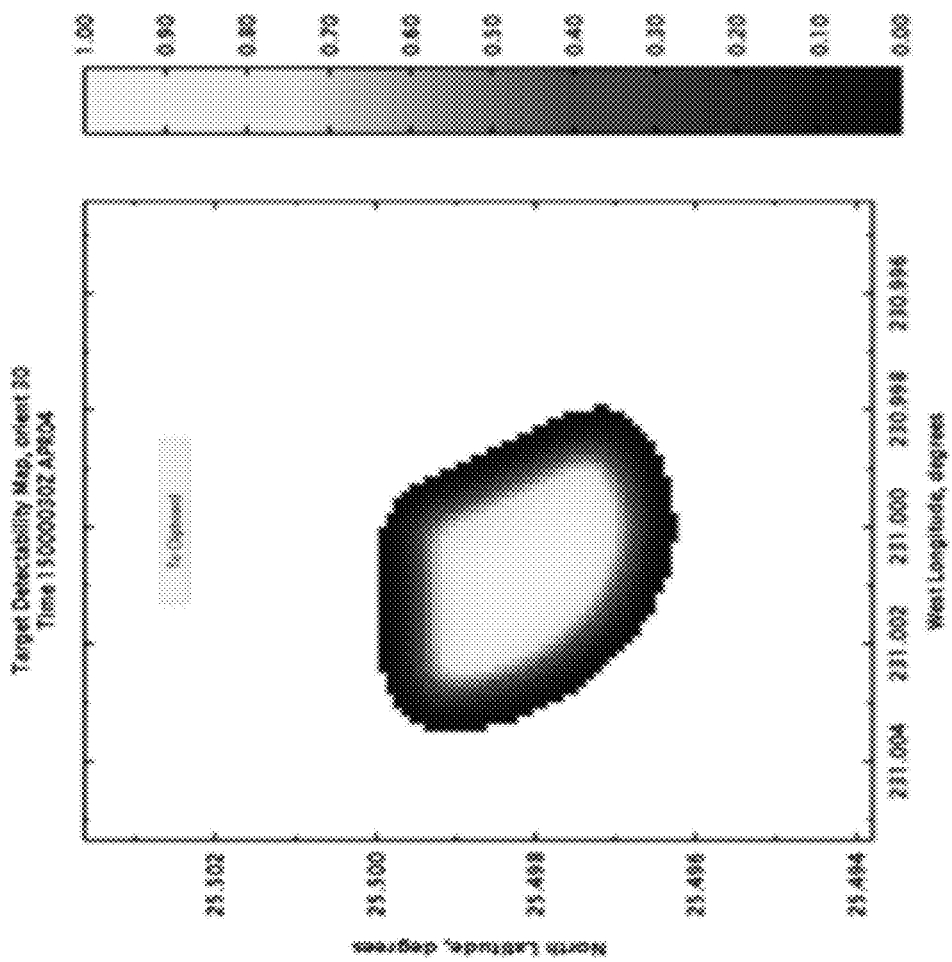
FIG. 7 is an example of a Target Detectibility (TD) Map for a given heading and time.

The TD Maps include a set of predicted target detection probabilities for a range of possible USV poses at selected times in the future. They are generated via a model-based agent-simulation (see W. Monach, P. McMorran, and T. McSherry, "Non-Gaussian Tracking Engine (NGTE) Algorithm Description," Daniel H. Wagner Associates," Report to NSWC-DD, August 2008), which accounts for the limited field of view of the sensor, uncertainties in the motion model of the target, and the interaction of the target with the environment. The TD Map is represented as a four dimensional grid (2D surface position, heading, and time), and each cell in the grid has a probability $P(x, \theta, t)$ of detecting the target if the USV is at the position x with the heading $\theta$ at time t. An example of a TD Map for a particular heading and a particular time is shown in FIG. 7. In FIG. 7 lighter colors indicate a higher probability of target detection at those locations. The primary purpose of the TD Map is to encode the sensor model in a grid, so that a computationally demanding sensor model calculation can be carried out outside of the planning modules.

Strategic Planner

The Strategic Planner receives TD Maps and outputs a waypoint goal to maintain target tracking. In addition to indicating two-dimensional surface positions, the waypoint goal has a desired heading and an arrival time, for a total of four dimensions. The desired heading is required to ensure directional sensors are pointed toward the target, and the arrival time information allows the algorithm to synchronize the USV's motion with that of the moving target.

A sequence of waypoints $p_{WP}(t_i)$ to trail the target at times $t_i$, (i=0, 1, , , ) is computed as follows. The waypoint sequence starts from the current USV location $p_A$ $$p_{WP}(t_0) = p_A, \quad (11)$$

where $t_0$ is the current time. A unit vector from the USV to the predicted position of the target at time $t_i$ (i>0) is $$n_i = \frac{p_T(t_i) - p_{WP}(t_{i-1})}{\|p_T(t_i) - p_{WP}(t_{i-1})\|}$$

where $p_T(t_i)$ is the target position at time $t_i$ based on a nominal prediction. Due to the difference in time $t_i$ and $t_{i-1}$, this unit vector only approximates the relative bearing of the target.

In order to maintain detection of the target, we give the waypoint heading the highest priority, since the forward-looking sensor must be facing the target. Thus, we first choose the desired heading to be $$\theta_i = \angle n_i \quad (12)$$

and then take a slice of the TD Map with a heading closest to $\theta_i$ and time $t_i$. Then, the "centroid of probability", $c_P(\theta_i, t_i)$, is computed as the average of all cells in the map, weighted by the probability detection at each cell:

$$c_P(\theta_i, t_i) = \frac{\sum_{j,k} P(x_{j,k}, \theta_i, t_i) x_{jk}}{\sum_{j,k} P(x_{jk}, \theta_i, t_i)} \quad (13)$$

where $x_{jk}$ is the position at the (j, k) element of the TD Map grid that is sliced at heading $\theta_i$ and time $t_i$. Note that $c_P$ is close to the centroid of the detectability region's shape for the current sensor model, since the map is nearly uniform. Also, the center of probability is a good choice given the current sensor model's convex shape.

The next step is to check if the centroid $c_P(\theta_i, t_i)$ is in front of the USV, by calculating the along-track distance d from the USV to the centroid $$d = n_i \cdot (c_P(\theta_i, t_i) - p_{WP}(t_{i-1})). \quad (14)$$

Finally, the trailing waypoint at $t_i$ is obtained as $$p_{WP}(t_i) = p_{WP}(t_{i-1}) + \max\{0, d\} n_i \quad (15)$$

Figure 8B:
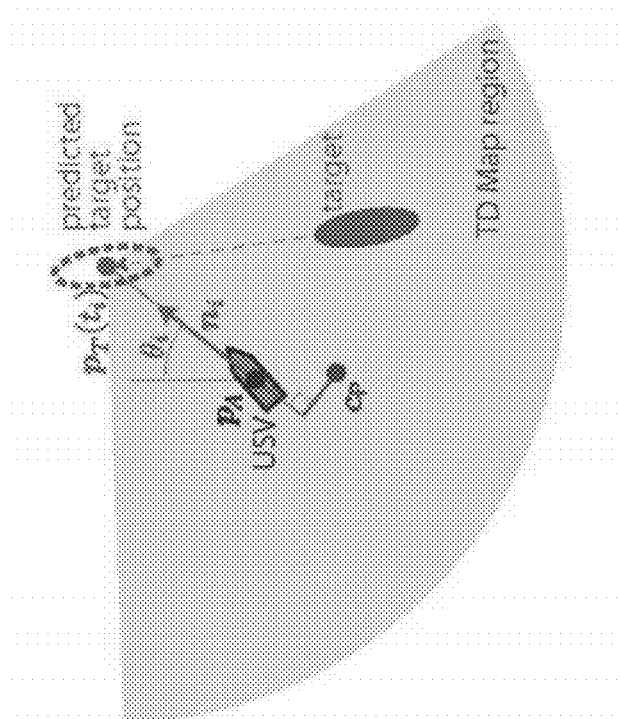
FIG. 8B is a diagram that illustrates the first waypoint goal ($t=t_1$) in which the centroid of the probability map is behind the USV (d<0).
Figure 8A:
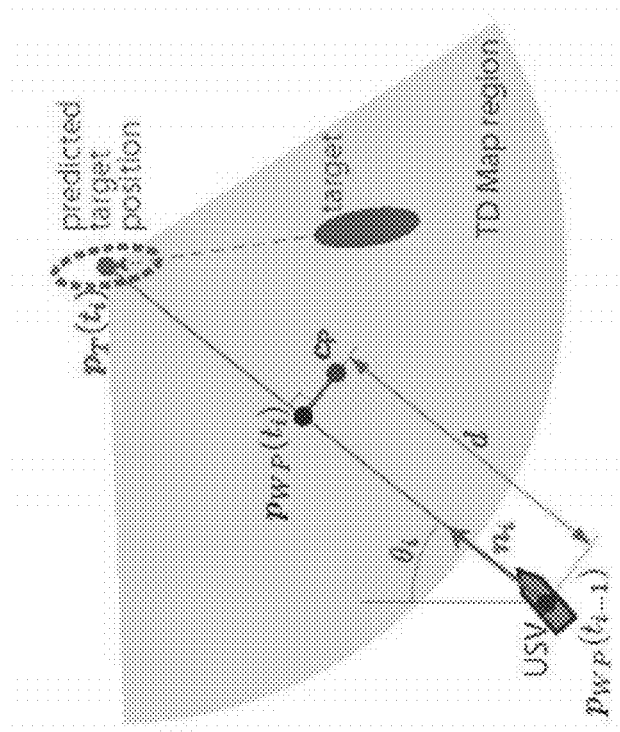
FIG. 8A is a diagram that illustrates the first waypoint goal ($t=t_1$) in which the USV is behind the centroid of the probability map (d>0).

If d is positive (as in FIG. 8A), it will use the centroid $c_P(\theta_i, t_i)$ projected onto a line that starts from $p_{WP}(t_{i-1})$ and is in the direction of $n_i$. Otherwise (as in FIG. 8B), we skip using this time $t_i$ because the motion to this point $p_{WP}(t_i)$ would require the USV to turn away from the target, thus causing the USV to lose track of the submarine. In this case, the USV will "wait" for the target to pass in front of it instead.

A series of positions $p_{WP}(t_i)$ with the arrival timestamp $t_i$ is passed to the local planner in order to adjust the desired goal direction and desired speed in (10). The strategic planner uses the latest TD Maps and typically updates the waypoint goal in a receding horizon fashion, before the USV actually reaches the waypoint goal.

Set-Up

The COLREGS algorithm was integrated within JPL's autonomy suite called CARACaS (Control Architecture for Robotic Agent Command and Sensing) (see T. Huntsberger, H. Aghazarian, A. Castano, G. Woodward, C. Padgett, D. Gaines, and C. Buzzell, "Intelligent autonomy for unmanned sea surface and underwater vehicles," in AUVSI Unmanned Systems North America, 2008) that can receive vehicle state estimates from the on-board INS unit and perception outputs such as hazard maps, moving contact lists from the JPL stereo camera server or the SIS world map server.

CARACaS commands the USV through an integrated CAN bus. This CARACaS setup has been tested on the water to demonstrate various capabilities in the past including harbor patrol, boat following, and static hazard avoidance (see M. T. Wolf, C. Assad, Y. Kuwata, A. Howard, H. Aghazarian, D. Zhu, T. Lu, A. Trebi-Ollennu, and T. Huntsberger, "360-degree visual detection and target tracking on an autonomous surface vehicle," Journal of Field Robotics, vol. 27, no. 6, pp. 819-833, 2010; L. Elkins, D. Sellers, and W. R. Monach, "The autonomous maritime navigation (AMN) project: Field tests, autonomous and cooperative behaviors, data fusion, sensors, and vehicles," Journal of Field Robotics, vol. 27, no. 6, pp. 790-818, 2010; and T. Huntsberger, H. Aghazarian, A. Howard, and D. C. Trotz, "Stereo vision based navigation for autonomous surface vessels," Journal of Field Robotics, vol. 28, no. 1, pp. 3-18, 2011.

Figure 9A:
FIG. 9A is an image of a CMV, the USV boat used in the on-water COLREGS testing.

FIG. 9A shows the USV, called CMV, used in the test. CMV has been tested on the water, controlled with CARACaS, to demonstrate various capabilities in the past including harbor patrol, boat following, and static hazard avoidance. The traffic ships used in the tests are one 12 m craft (shown in FIG. 9B) and two 7 m RHIBs (shown in FIG. 9C).

Figure 10:
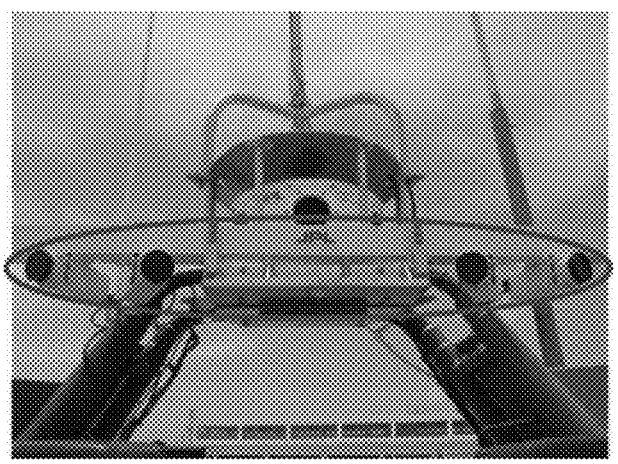
FIG. 10 is an image of the JPL stereo cameras (outlined in the ellipse) on the boat.

FIG. 10 shows a picture of the stereo cameras. The stereo bar has two pairs of stereo cameras, where one pair is looking left, and the other pair is looking right. The current JPL stereo system provides the position and velocity estimates of contacts (e.g., traffic boats) but not their orientation. The heading estimate of the traffic boat becomes noisier when the speed of the traffic boat is very low, especially with the waves in the ocean. In one embodiment, those contacts that are moving slower than an empirically determined threshold are treated as stationary hazards and COLREGS constraints are not applied.

Legends

Figure 11:
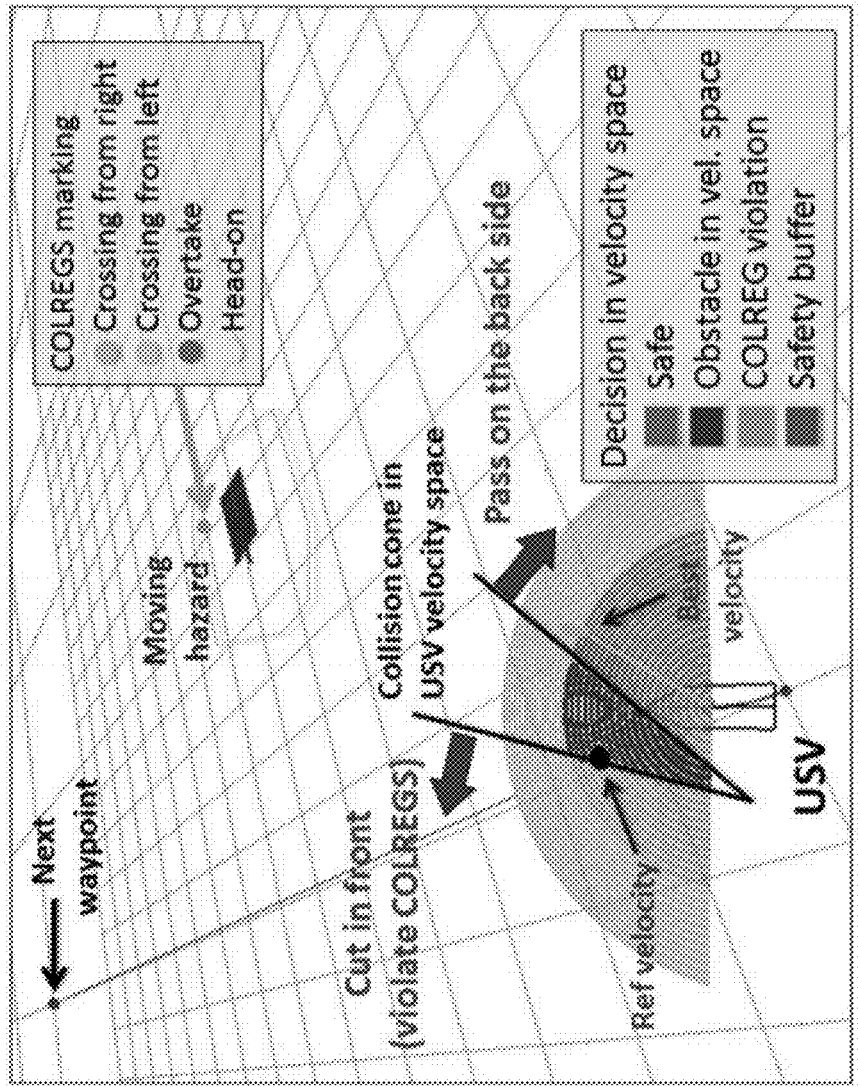
FIG. 11 is a diagram illustrating a simulation run in which the USV is in a crossing situation.

FIG. 11 shows a snapshot of a simulation run, involving one USV at the bottom and two moving vessels. The waypoint of the USV is set in front of the vehicle start location. There is a traffic boat coming from the right. The USV recognizes that it is in a crossing situation and starts maneuvering toward starboard.

The regions around the USV represent the velocity decision space. As shown in the lower right of the figure, there is a region that has a safe velocity, there is a region that represents VO, there is a region that is expanded by WVO, acting as a safety buffer, and there is a region that represents a COLREGS violation (the "crossing" rule in this figure). Since the cost function is continuous, the color has some shading. There is a region limits the maximum velocity that the motion planner can choose. The line from the USV shows the best velocity (and its direction) selected by the algorithm.

As shown in the upper right of FIG. 11, a small dot is plotted above the moving contact if it is in a COLREGS situation with the USV. The dot can be color-coded (or it could be coded with a shape or some other indicator) to represent the type of the COLREGS, and we consider head-on, overtaking, and crossing from the right and left in this discussion. Note that because of the hysteresis in the rule selection, a traffic vessel could be considered to be in more than one COLREGS situation, and could be marked with multiple dots with different colors.

Examples

COLREGS Runs with Four Vessels

Figure 9B:
FIG. 9B is an image of a 12 m traffic boat.
Figure 9C:
FIG. 9C is an image of a 7 m RHIB traffic boat.

We now present the results of COLREGS on-water tests involving four vessels. The CMV was used as the USV, as shown in FIG. 9A, and the 12 m craft and two 7 m RHIBs are used as traffic vessels, as shown in FIG. 9B and FIG. 9C. In all scenarios, the USV was given a waypoint that was about 1000 m away in front, and was commanded to reach the waypoint while obeying COLREGS with traffic vessels. The USV's nominal speed was 8 knots (4 m/s) in these tests. The algorithmic parameters such as thresholds to decide which rules to apply were tuned through simulation and at-sea tests with feedback from boat drivers.

Scenario #1: Head-on and Crossing:

In this scenario, the USV first overtakes a traffic vessel. As it maneuvers around it, other two vessels start to approach the USV, creating a head-on situation.

FIG. 12A1 through FIG. 12F show the results of the on-water run. The images show the body-fixed view of the run: two images at the top are from the left-looking and right-looking stereo cameras, and the image below them shows the USV, detected objects, and the decision space of the COLREGS motion planner, as shown schematically in FIG. 11. Two-dimensional plots in the global frame in plan view are provided, showing the USV path, the current pose of the USV (marked with a triangle), the stereo camera field of view (denoted with gray lines), and the objects that were detected by the stereo system.

The USV is first given a waypoint and drives toward it. In FIG. 12A1, the USV detects one of the 7 m RHIBs at a far distance. The estimated velocity is low enough that the USV simply treats it as a stationary hazard, and no COLREGS constraint is applied. The direction of the waypoint is represented with a line.

As the 7 m RHIB approaches, the USV recognizes the head-on situation and applies the COLREGS constraint, as shown in FIG. 12B1. The COLREGS constraints encourage the head-on evasive maneuver to turn right by prohibiting velocities to the left. The head-on situation is marked with a dot on top of the detected vessel.

In FIG. 12C1, the USV detects another vessel approaching from the front, recognizes the USV is in a head-on COLREGS situation with both vessels, and moves to the starboard side. At this moment, although the 12 m boat is visible in the image, it is not yet detected by the vehicle tracker in the stereo system.

As it maneuvers around the two vessels, the 12 m craft comes from USV's starboard side, creating a crossing situation. In FIG. 12D1, the 12 m ship is detected, and the USV avoids all three vessels by further altering its path to its starboard. As the USV turns and changes its orientation, the heading difference between the 12 m boat and the USV changes from almost perpendicular to almost opposite. The USV treats the 12 m vehicle to be in both the crossing situation (marked with a dot) and the head-on situation. Note that both "crossing from the right" and head-on COLREGS require that the USV alter its path to the starboard, and they correspond to the same COLREGS constraints in the USV's decision space.

FIG. 12E1 shows successful avoidance of the 12 m boat. Note that the rectangular contact shown in the lower left includes the detected contact and the minimum clearance between vessels (imposed by boat drivers). Therefore, the contact in the lower left plot looks closer to USV than the 12 m boat in the stereo image. The USV then continues its drive toward the waypoint that was given initially, as shown in FIG. 12F.

The plots of the traffic vessels are generated purely based on the stereo system's output and show the information that was available to the motion planner to make decision on USV's maneuver. In fact, there is no inter-vehicle communication during the run.

Scenario #2: Overtake, Head-on, and Crossing:

In FIG. 13A1, the USV recognizes the overtaking situation and initiates a turn maneuver toward starboard, even though the straight line to the waypoint passes on the port side of the traffic boat. This behavior emerges from the COLREGS constraints, which requires the USV to overtake from the starboard side, obeying COLREGS.

During the overtaking in FIG. 13B1, the USV detects another vessel in the head-on situation. The USV recognizes that it is in the head-on situation as well as overtaking. COLREGS constraints require the USV to turn away from the waypoint when avoiding the head-on vessel.

In FIG. 13C1, the USV avoids the head-on vessel. Another vessel coming from the right is visible in the stereo image, but is yet to be confirmed by the vehicle tracker in the stereo system.

After a successful avoidance of the head-on vessel, the USV is in both the head-on and crossing situation in FIG. 13D1. It turns to its starboard to let the 12 m boat maintain its course, because that boat is the stand-on vessel in this situation.

Subsequent to the successful avoidance of the 12 m boat in FIG. 13E1, the 7 m RHIB being overtaken comes in the view again in FIG. 13F1. Because it is far away enough, the USV does not consider this situation to be overtaking. Note that the hazard avoidance constraint is always on, as shown in the cone in the plot.

Figure 13G:
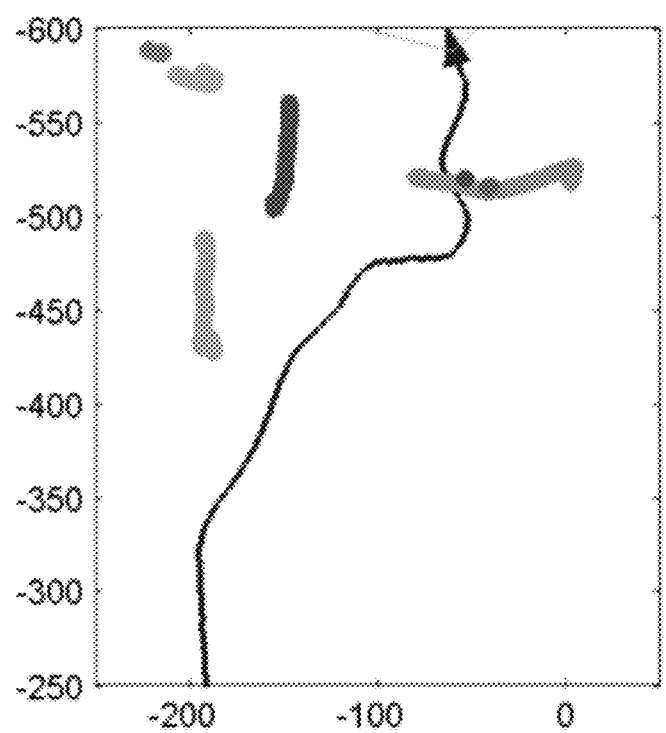
FIG. 13G is a diagram illustrating the overall path.

FIG. 13G shows the overall paths of the USV and detected vessels. Note the slight meander of the USV's path in the last segment. This is caused by the inaccurate state estimate of the vessel that was being overtaken (the contacts shown in the upper left corner of the figure). When the traffic vessel first enters the field of view of the camera while the USV is turning, the current object tracker tends to treat it as a vessel heading toward the USV. It is expected that one solution to this sensor issue is to extend the field of view of the stereo camera system by adding another pair of cameras pointing sideways, so that the USV can maintain tracking of the target vessel during the overtake maneuver.

The run time of the motion planning algorithm of each cycle was a few milliseconds on a 32-by-128 velocity space grid on a PC104 single-board microcomputer running the QNX operating system, available from QNX Software Systems Limited, 1001 Farrar Road, Ottawa, Ontario, Canada, K2K 0B3. There are numerous vendors of PC104 single board microcomputers, for example, VersaLogic Corp., 4211 W. 11th Ave., Eugene Oreg. 97402. In addition, the PC/104 Consortium creates, maintains and distributes specifications supporting the PC/104 form factor. The specifications include PC/104, PC/104-Plus, PCI-104, EBX and EPIC. The initial release of the PC/104 specification in March of 1992 was an open design offering the power and flexibility of an IBM compatible personal computer (e.g., a general purpose programmable computer) in a size ideally suited for embedding. As mentioned before, the run time is approximately linear with respect to the number of obstacles. Even with 20 or more moving hazards, the algorithm continues to run well in real-time.

Trailing Runs

Figure 14A:
FIG. 14A is an image of the USV, a PowerVent boat used in the on-water testing.
Figure 14B:
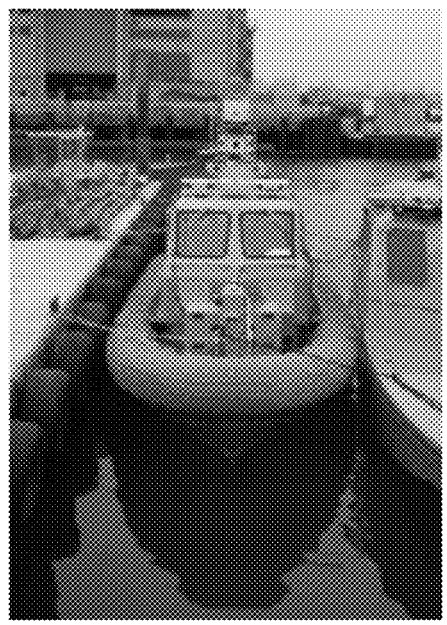
FIG. 14B is an image of an 11 m RHIB, the traffic boat.

The architecture of the autonomy software is versatile, and the trailing runs were conducted on a different boat. FIG. 14A shows the USV, called PowerVent, used in the test. FIG. 14B shows the 11 m RHIB, a traffic boat we used to generate COLREGS situations (the traffic boat was detected by the radar mounted on PowerVent).

As a trailing target, a simulated submarine was used. The submarine simulator includes realistic dynamics of the submarine as well as the ability for a human operator to steer the submarine. The submarine was detected through a sonar simulator, which uses the pose of the actual PowerVent and incorporates a detailed sensor model to simulate the detection, such as a limited field of view (FOV) and the range dependency of the detection probability. The detected submarine is then passed to the world map server (WMS) (see L. Elkins, D. Sellers, and W. R. Monach, "The autonomous maritime navigation (AMN) project: Field tests, autonomous and cooperative behaviors, data fusion, sensors, and vehicles," Journal of Field Robotics, vol. 27, no. 6, pp. 790-818, 2010), which then relays the contact to CARACaS. By the time CARACaS receives the contact from WMS, there is no distinction between a real submarine and a simulated submarine.

Trailing a Maneuvering Target

Figure 15A:
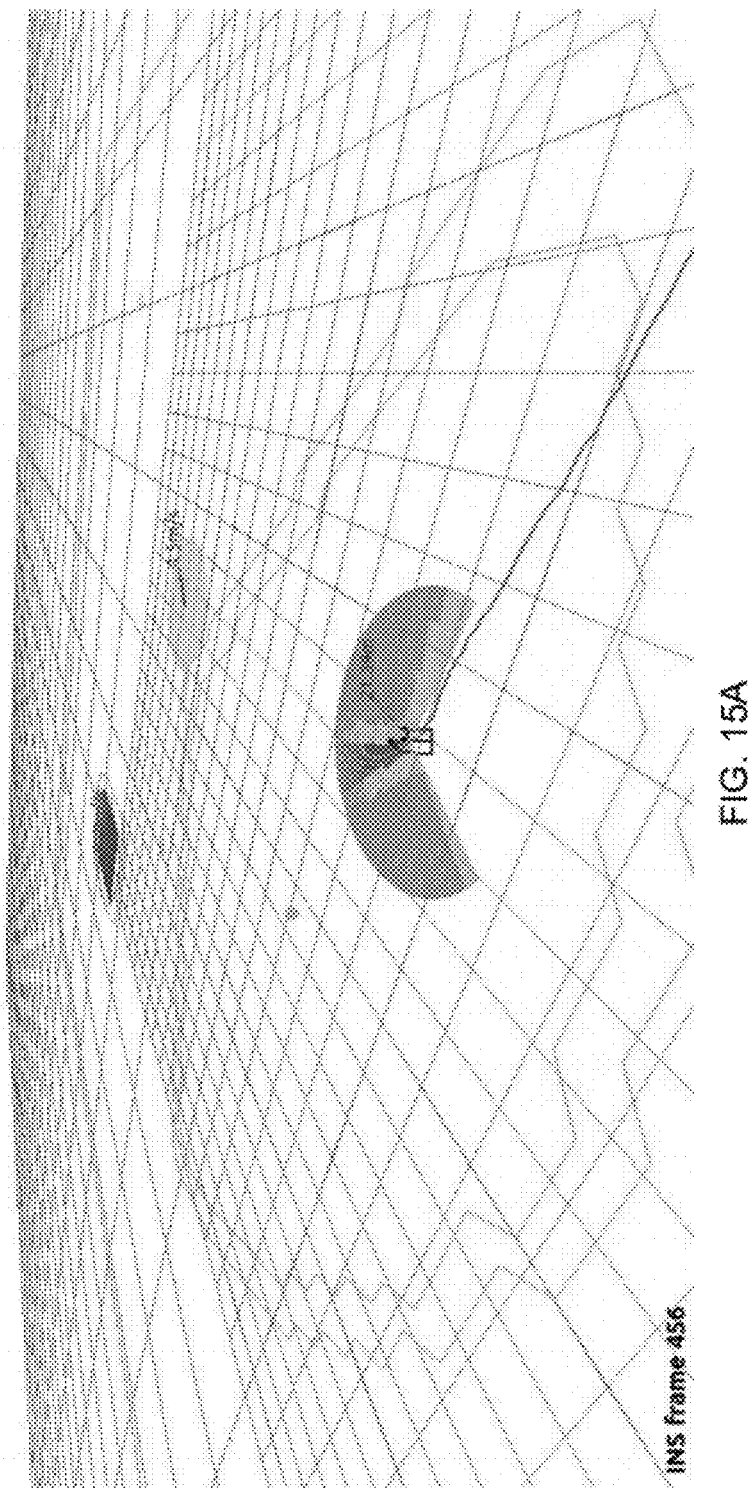
FIG. 15A is a diagram that illustrates the submarine maneuvering to the right as the USV trails.
Figure 15B:
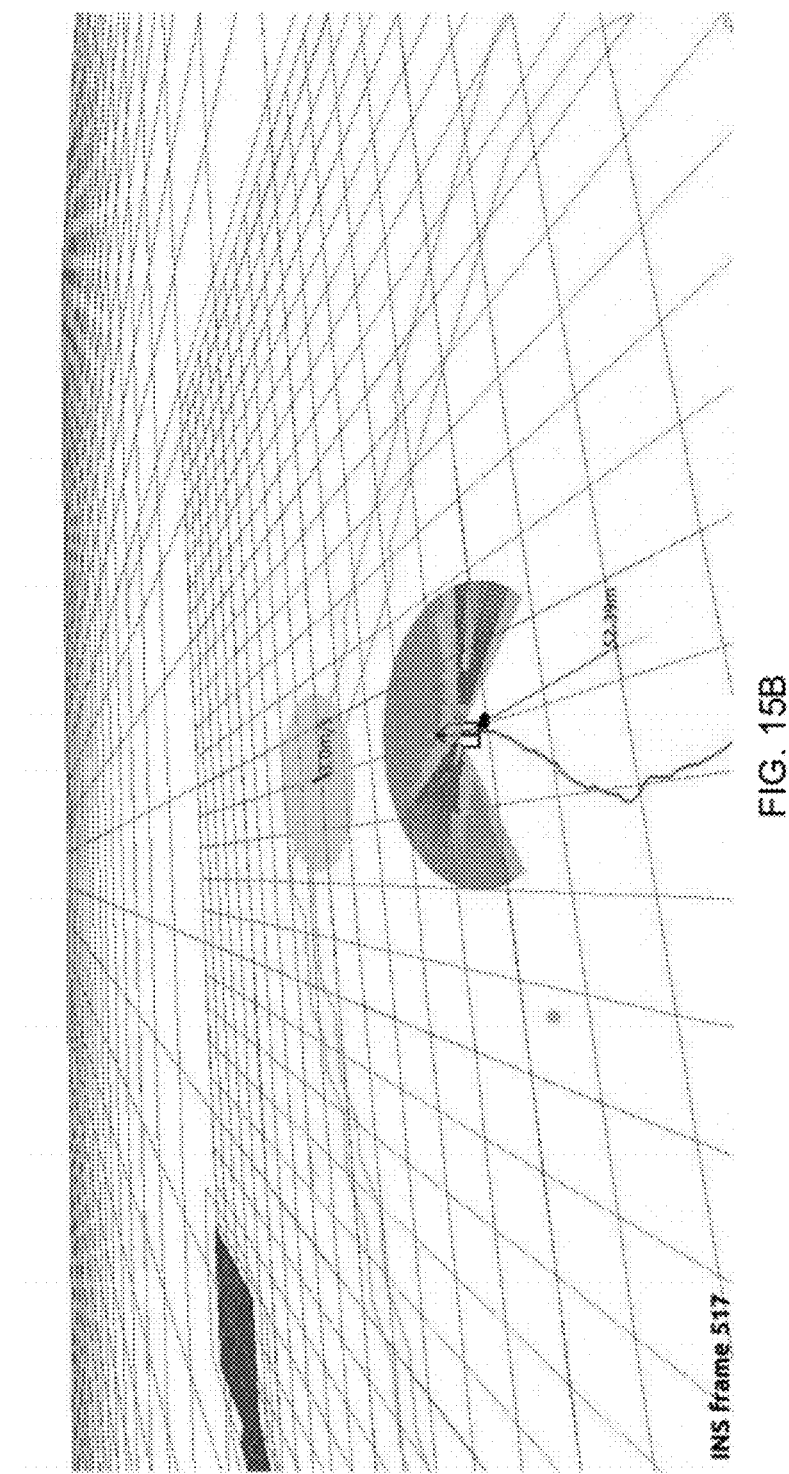
FIG. 15B is a diagram that illustrates that the submarine has slowed down, and has turned 180 degrees and is now headed at the USV.
Figure 15C:
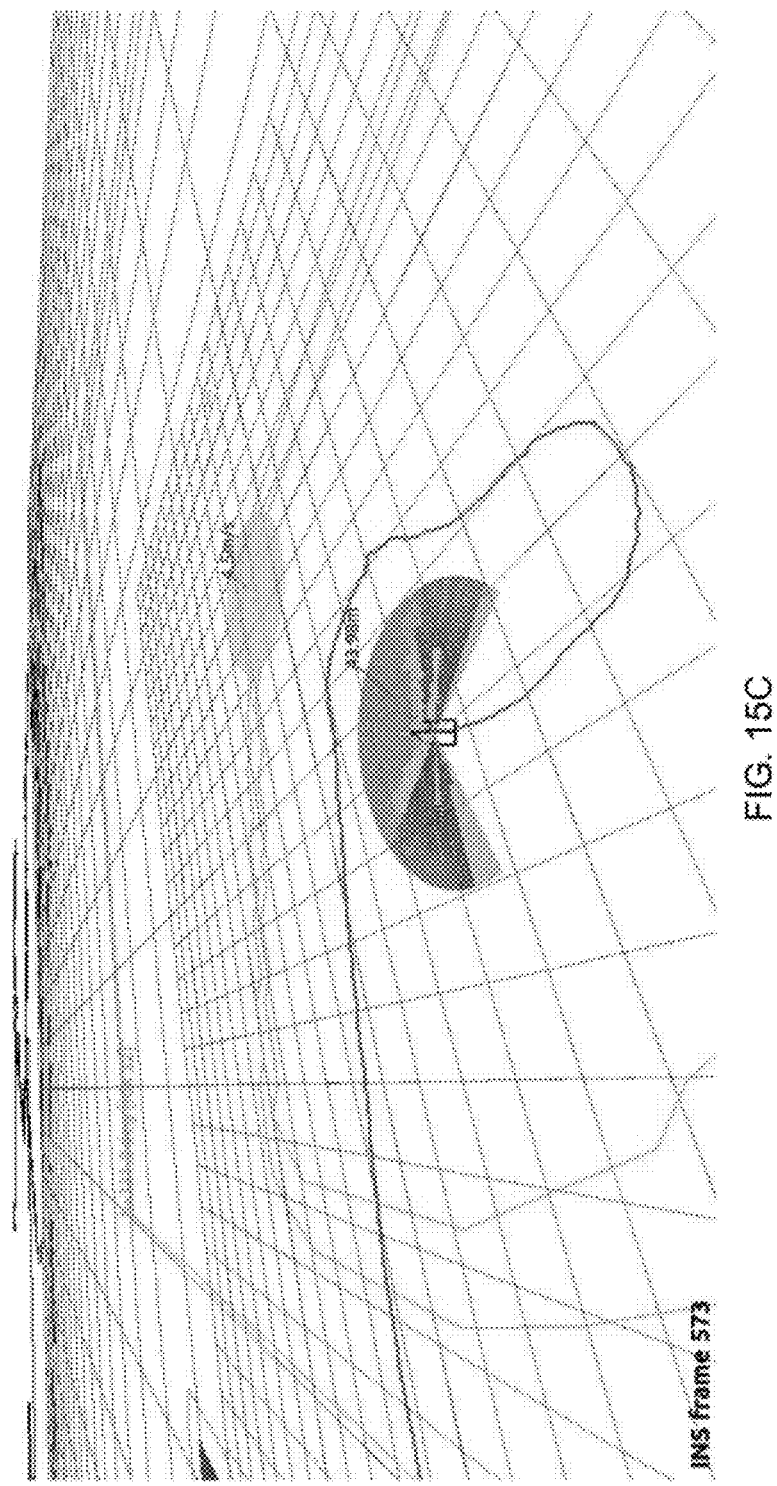
FIG. 15C is a diagram that illustrates that the USV has maintained trail through a 360 degree turn.

FIG. 15A through FIG. 15C show a scenario in which the submarine driver was aggressively attempting to evade the USV. The submarine is shown as a large circle.

The sub attempts several quick changes of speed and direction. FIG. 15A is a diagram that illustrates the submarine maneuvering to the right as the USV trails. FIG. 15B is a diagram that illustrates that the submarine has slowed down, and has turned 180 degrees and is now headed at the USV. FIG. 15C is a diagram that illustrates that the USV has maintained trail through a 360 degree turn. Tight submarine turns generated a case in FIG. 8B, which place the USV in front of the centroid of the TD Map. However, the USV maintains the trail throughout.

Figure 16:
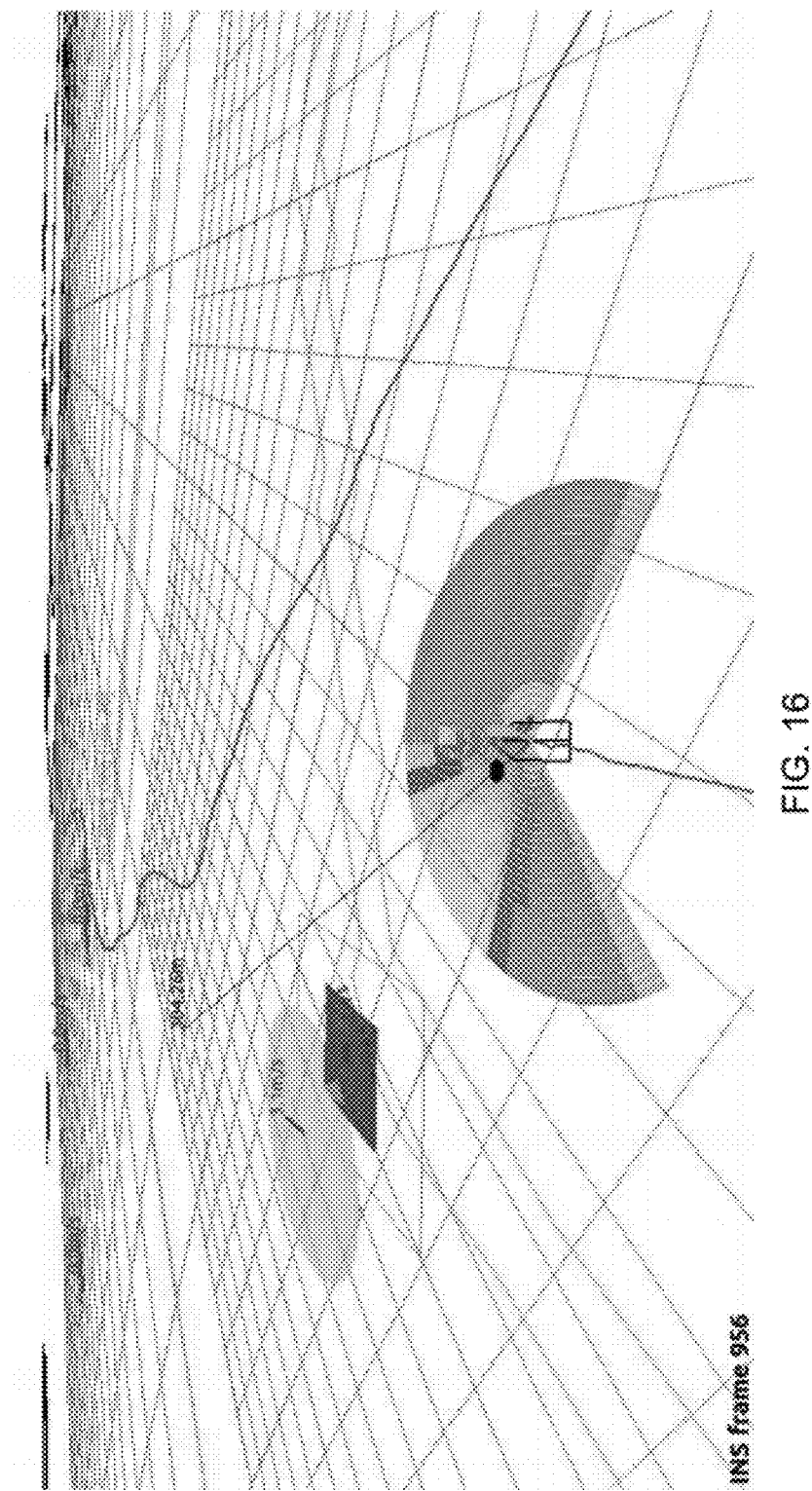
FIG. 16 is a diagram that illustrates how the USV navigates around a buoy while trailing the submarine.

FIG. 16 shows a snapshot from a scenario, in which the USV trails the submarine as the sub goes under a buoy, turns around, and passes under the buoy again. The buoy was detected by the radar, which the USV treated as a stationary hazard to avoid, as the representation of the velocity space in the figure indicates. The waypoint-based reference velocity is in a region having a short time to collision with the buoy, so a velocity to the side is chosen instead, as indicated by the "post". Once the USV is clear of the buoy, the velocity space changes to a safe region and the USV followed the reference velocity directly. During these runs, the submarine driver was unable to cause the USV to lose trail via maneuvers and use of static surface hazards.

Trailing with Stationary Hazards and COLREGS

Figure 17:
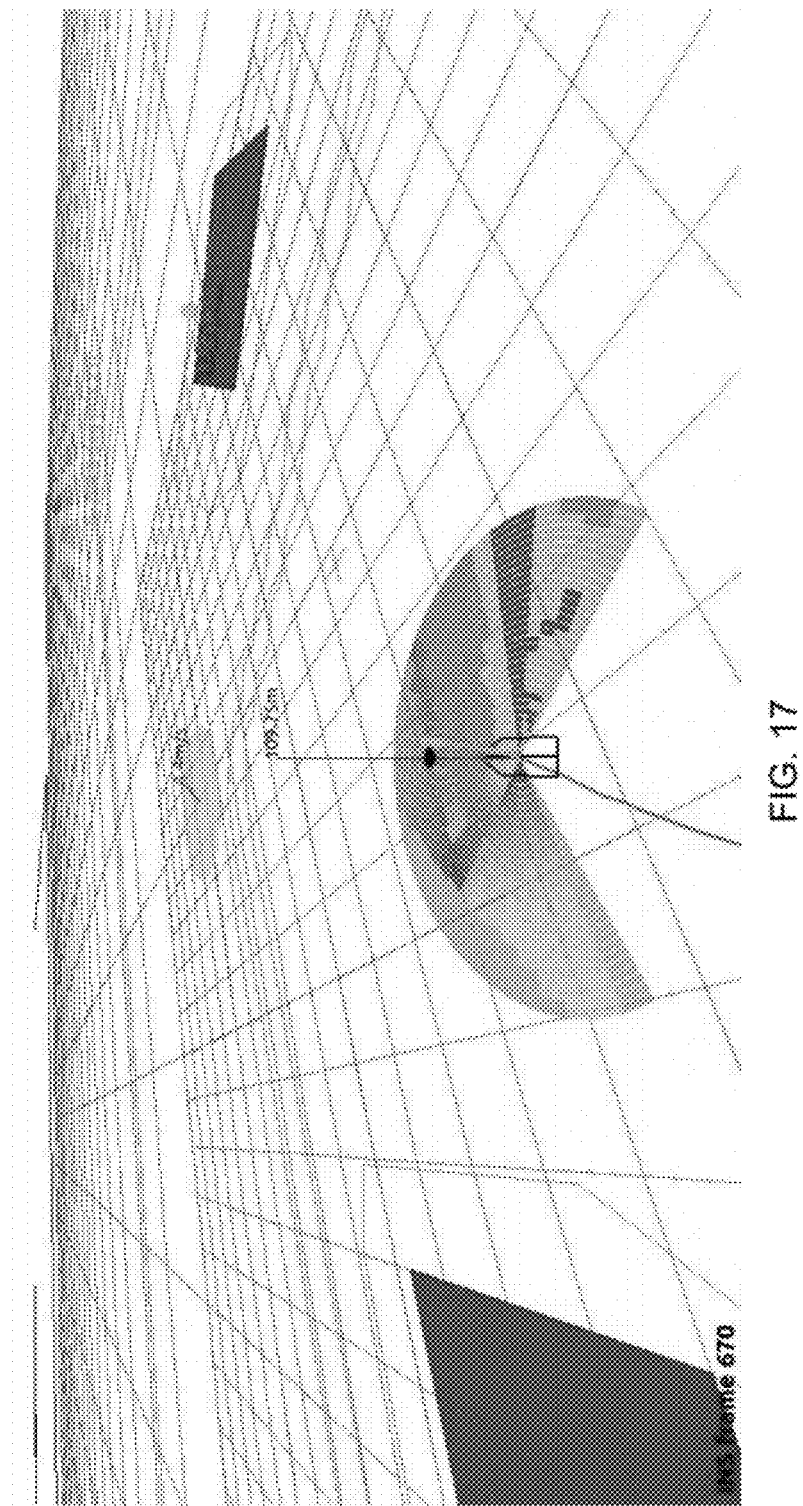
FIG. 17 is a diagram that illustrates a COLREGS crossing situation during trailing.
Figure 18:
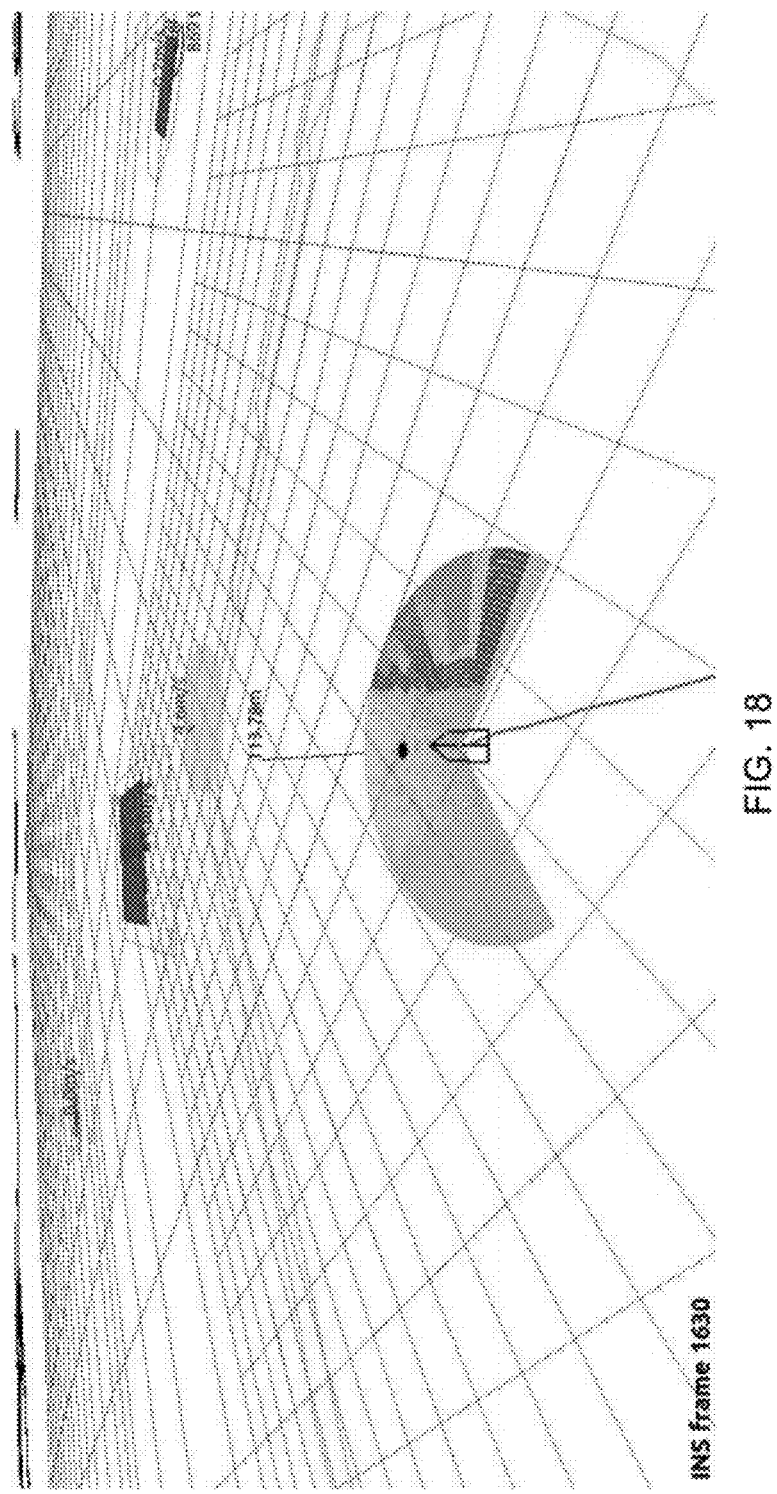
FIG. 18 illustrates a COLREGS head-on situation during trailing.

FIG. 17 and FIG. 18 show COLREGS situations that were encountered while trailing the target. In FIG. 17, the USV applies COLREGS crossing while simultaneously avoiding a stationary hazard. The dark COLREGS velocity space constraint is visible for the crossing situation, with the entire port side excluded because of the buoy on that side. Note the dot above the contact on the right and the region in the velocity decision space. Buoys to the port of the USV are being avoided simultaneously.

In FIG. 18, the USV is in a head-on situation, and the COLREGS rule prohibits turning to port. At the same time, the velocity obstacle to the buoy excludes the option of continuing straight, so the USV turns to starboard, as expected. Note the dot above the contact and the region in the velocity decision space.

DEFINITIONS

Unless otherwise explicitly recited herein, any reference to an electronic signal or an electromagnetic signal (or their equivalents) is to be understood as referring to a non-volatile electronic signal or a non-volatile electromagnetic signal.

Recording the results from an operation or data acquisition, such as for example, recording results at a particular frequency or wavelength, is understood to mean and is defined herein as writing output data in a non-transitory manner to a storage element, to a machine-readable storage medium, or to a storage device. Non-transitory machine-readable storage media that can be used in the invention include electronic, magnetic and/or optical storage media, such as magnetic floppy disks and hard disks; a DVD drive, a CD drive that in some embodiments can employ DVD disks, any of CD-ROM disks (i.e., read-only optical storage disks), CD-R disks (i.e., write-once, read-many optical storage disks), and CD-RW disks (i.e., rewriteable optical storage disks); and electronic storage media, such as RAM, ROM, EPROM, Compact Flash cards, PCMCIA cards, or alternatively SD or SDIO memory; and the electronic components (e.g., floppy disk drive, DVD drive, CD/CD-R/CD-RW drive, or Compact Flash/PCMCIA/SD adapter) that accommodate and read from and/or write to the storage media. Unless otherwise explicitly recited, any reference herein to "record" or "recording" is understood to refer to a non-transitory record or a non-transitory recording.

As is known to those of skill in the machine-readable storage media arts, new media and formats for data storage are continually being devised, and any convenient, commercially available storage medium and corresponding read/write device that may become available in the future is likely to be appropriate for use, especially if it provides any of a greater storage capacity, a higher access speed, a smaller size, and a lower cost per bit of stored information. Well known older machine-readable media are also available for use under certain conditions, such as punched paper tape or cards, magnetic recording on tape or wire, optical or magnetic reading of printed characters (e.g., OCR and magnetically encoded symbols) and machine-readable symbols such as one and two dimensional bar codes. Recording image data for later use (e.g., writing an image to memory or to digital memory) can be performed to enable the use of the recorded information as output, as data for display to a user, or as data to be made available for later use. Such digital memory elements or chips can be standalone memory devices, or can be incorporated within a device of interest. "Writing output data" or "writing an image to memory" is defined herein as including writing transformed data to registers within a microcomputer.

"Microcomputer" is defined herein as synonymous with microprocessor, microcontroller, and digital signal processor ("DSP"). It is understood that memory used by the microcomputer, including for example instructions for data processing coded as "firmware" can reside in memory physically inside of a microcomputer chip or in memory external to the microcomputer or in a combination of internal and external memory. Similarly, analog signals can be digitized by a standalone analog to digital converter ("ADC") or one or more ADCs or multiplexed ADC channels can reside within a microcomputer package. It is also understood that field programmable array ("FPGA") chips or application specific integrated circuits ("ASIC") chips can perform microcomputer functions, either in hardware logic, software emulation of a microcomputer, or by a combination of the two. Apparatus having any of the inventive features described herein can operate entirely on one microcomputer or can include more than one microcomputer.

General purpose programmable computers useful for controlling instrumentation, recording signals and analyzing signals or data according to the present description can be any of a personal computer (PC), a microprocessor based computer, a portable computer, or other type of processing device. The general purpose programmable computer typically comprises a central processing unit, a storage or memory unit that can record and read information and programs using machine-readable storage media, a communication terminal such as a wired communication device or a wireless communication device, an output device such as a display terminal, and an input device such as a keyboard. The display terminal can be a touch screen display, in which case it can function as both a display device and an input device. Different and/or additional input devices can be present such as a pointing device, such as a mouse or a joystick, and different or additional output devices can be present such as an enunciator, for example a speaker, a second display, or a printer. The computer can run any one of a variety of operating systems, such as for example, any one of several versions of Windows, or of MacOS, or of UNIX, or of Linux. Computational results obtained in the operation of the general purpose computer can be stored for later use, and/or can be displayed to a user. At the very least, each microprocessor-based general purpose computer has registers that store the results of each computational step within the microprocessor, which results are then commonly stored in cache memory for later use.

Many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein, so long as at least some of the implementation is performed in hardware.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, or publication identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. A system for navigating an unmanned waterborne surface vehicle safely to a desired location, comprising:
   one or more sensors configured to be mounted on an unmanned waterborne surface vehicle, said one or more sensors configured to detect the presence of one or more objects different from said unmanned waterborne surface vehicle in the vicinity of said one or more sensors, each of said one or more sensors having a control terminal configured to allow control of said sensor, and each of said one or more sensors having an output terminal configured to provide a signal representative of said presence of said one or more objects different from said unmanned waterborne surface vehicle; and
   a general purpose programmable computer including instruction recorded on a machine readable memory, said general purpose programmable computer operatively coupled to each of said one or more sensors, said general purpose programmable computer when operating under said instructions configured to perform the following steps:
   (i) controlling an operational state of each of said one or more sensors, said operational state selected from the group of operational states consisting of an on state and an off state;
   (ii) receiving from said one or more sensors one or more respective output signals representative of the presence of said one or more objects different from said unmanned waterborne surface vehicle;
   (iii) deducing from said received one or more respective output signals whether there is present said one or more objects different from said unmanned waterborne surface vehicle;
   (iv) if there is present said one or more objects different from said unmanned waterborne surface vehicle, computing for each such object a location, a velocity and a heading;
   (v) applying a first set of rules configured to direct said unmanned waterborne surface vehicle to reach a desired location;
   (vi) applying a second set of rules configured to direct said unmanned waterborne surface vehicle to avoid each of said one or more objects different from said unmanned waterborne surface vehicle that are present;
   (vii) generating a command to be issued to said unmanned waterborne surface vehicle to operate at a particular velocity and along a particular heading, so as to approach said desired location while avoiding a collision with each of said one or more objects different from said unmanned waterborne surface vehicle that are present; and
   (viii) iteratively repeating steps (i) through (vii) until said desired location is reached.

2. The system for navigating an unmanned waterborne surface vehicle safely to a desired location of claim 1, further comprising an unmanned waterborne surface vehicle operatively connected to said one or more sensors and to said general purpose programmable computer.

3. The system for navigating an unmanned waterborne surface vehicle safely to a desired location of claim 1, wherein said object different from said unmanned waterborne surface vehicle is a hazardous object.

4. The system for navigating an unmanned waterborne surface vehicle safely to a desired location of claim 1, wherein said object different from said unmanned waterborne surface vehicle is an object of interest to be followed.

5. The system for navigating an unmanned waterborne surface vehicle safely to a desired location of claim 1, wherein said desired location is a position in proximity to said object of interest to be followed.

6. The system for navigating an unmanned waterborne surface vehicle safely to a desired location of claim 5, wherein said desired location is updated using a most recent position of said object of interest to be followed.

7. The system for navigating an unmanned waterborne surface vehicle safely to a desired location of claim 1, wherein said desired location is a location defined on a map of the Earth's surface.

8. The system for navigating an unmanned waterborne surface vehicle safely to a desired location of claim 1, wherein said general purpose programmable computer when operating under said instructions configured to perform the step of displaying to a user information that is representative of said location, said velocity and said heading for at least one of said one or more objects different from said unmanned waterborne surface vehicle deduced as being present in step (iii).

9. The system for navigating an unmanned waterborne surface vehicle safely to a desired location of claim 8, wherein said location, said velocity and said heading are computed in step (iv) relative to a location, a velocity and a heading of said unmanned waterborne surface vehicle.

10. The system for navigating an unmanned waterborne surface vehicle safely to a desired location of claim 1, wherein said general purpose programmable computer includes a user interface that allows a human operator to override a command generated in step (viii).

11. The system for navigating an unmanned waterborne surface vehicle safely to a desired location of claim 1, wherein said first set of rules is a strategic planner.

12. The system for navigating an unmanned waterborne surface vehicle safely to a desired location of claim 1, wherein said second set of rules is a local planner.

13. The system for navigating an unmanned waterborne surface vehicle safely to a desired location of claim 1, wherein said second set of rules includes International Regulations for Preventing Collisions at Sea (COLREGS rules).

14. The system for navigating an unmanned waterborne surface vehicle safely to a desired location of claim 1, wherein said one or more sensors are selected from the group of sensors consisting of radar, sonar, lidar and stereo cameras.

15. A method of navigating an unmanned waterborne surface vehicle safely to a desired location, comprising the steps of:
(i) controlling an operational state of each of one or more sensors, said operational state selected from the group of operational states consisting of an on state and an off state, said one or more sensors configured to detect the presence of one or more objects different from said unmanned waterborne surface vehicle in the vicinity of said one or more sensors, each of said one or more sensors having a control terminal configured to allow control of said sensor, and each of said one or more sensors having an output terminal configured to provide a signal representative of said presence of said one or more objects different from said unmanned waterborne surface vehicle; and
using a general purpose programmable computer including instruction recorded on a machine readable memory to perform the following steps:
(ii) receiving from said one or more sensors one or more respective output signals representative of the presence of said one or more objects different from said unmanned waterborne surface vehicle;
(iii) deducing from said received one or more respective output signals whether there is present said one or more objects different from said unmanned waterborne surface vehicle;
(iv) if there is present said one or more objects different from said unmanned waterborne surface vehicle, computing for each such object a location, a velocity and a heading;
(v) applying a first set of rules configured to direct said unmanned waterborne surface vehicle to reach a desired location;
(vi) applying a second set of rules configured to direct said unmanned waterborne surface vehicle to avoid each of said one or more objects different from said unmanned waterborne surface vehicle that are present;
(vii) generating a command to be issued to said unmanned waterborne surface vehicle to operate at a particular velocity and along a particular heading, so as to approach said desired location while avoiding a collision with each of said one or more objects different from said unmanned waterborne surface vehicle that are present; and
(viii) iteratively repeating steps (i) through (vii) until said desired location is reached by said unmanned waterborne surface vehicle initially located at a first known location.

16. The method of navigating an unmanned waterborne surface vehicle safely to a desired location of claim 15, wherein said desired location is a location proximate to one of the objects deduced to be present in step (iii).

17. The method of navigating an unmanned waterborne surface vehicle safely to a desired location of claim 15, wherein said desired location is a predicted location of one of the objects deduced to be present in step (iii).

18. The method of navigating an unmanned waterborne surface vehicle safely to a desired location of claim 15, wherein said second set of rules includes International Regulations for Preventing Collisions at Sea (COLREGS rules).

19. The method of navigating an unmanned waterborne surface vehicle safely to a desired location of claim 15, wherein said one or more sensors are selected from the group of sensors consisting of radar, sonar, lidar and stereo cameras.

20. The method of navigating an unmanned waterborne surface vehicle safely to a desired location of claim 15, wherein said object different from said unmanned waterborne surface vehicle is an object of interest to be followed.

* * * * *